United States Patent
Roberts et al.

(10) Patent No.: US 11,519,254 B2
(45) Date of Patent: Dec. 6, 2022

(54) FILTER ASSEMBLY INCLUDING FLOW BORE DEFLECTOR

(71) Applicant: VALVEWORKS USA, INC., Bossier City, LA (US)

(72) Inventors: Todd Roberts, Bossier City, LA (US); Andrew Shamsabady, Bossier City, LA (US)

(73) Assignee: VALVEWORKS USA, INC., Bossier City, LA (US)

( * ) Notice: Subject to any disclaimer, the term of this patent is extended or adjusted under 35 U.S.C. 154(b) by 257 days.

(21) Appl. No.: 16/875,290

(22) Filed: May 15, 2020

(65) Prior Publication Data

US 2020/0362685 A1    Nov. 19, 2020

Related U.S. Application Data

(60) Provisional application No. 62/849,617, filed on May 17, 2019.

(51) Int. Cl.
| | | |
|---|---|---|
| *B01D 35/02* | (2006.01) | |
| *B01D 35/16* | (2006.01) | |
| *E21B 43/38* | (2006.01) | |
| *B01D 46/00* | (2022.01) | |

(52) U.S. Cl.
CPC ............ *E21B 43/38* (2013.01); *B01D 46/005* (2013.01)

(58) Field of Classification Search
CPC ....................................................... E21B 43/38
USPC ................................................. 210/454, 447
See application file for complete search history.

(56) References Cited

U.S. PATENT DOCUMENTS

| | | | | |
|---|---|---|---|---|
| 3,834,539 A | * | 9/1974 | Thompson ............... | F28F 19/01 |
| | | | | 4/256.1 |
| 4,051,042 A | * | 9/1977 | Tullier .................... | B01D 29/25 |
| | | | | 4/256.1 |
| 4,073,303 A | * | 2/1978 | Foley, Jr. ................. | F16L 55/46 |
| | | | | 15/104.062 |
| 4,124,511 A | * | 11/1978 | Lay ......................... | B01D 35/02 |
| | | | | 210/454 |
| 4,609,459 A | * | 9/1986 | Hendrix ................. | B01D 35/02 |
| | | | | 210/91 |
| 4,678,589 A | * | 7/1987 | Ayres, Jr. ............... | B01D 35/02 |
| | | | | 210/450 |
| 5,944,991 A | * | 8/1999 | Shellenbarger ......... | F16L 55/24 |
| | | | | 210/489 |
| 7,735,548 B2 | * | 6/2010 | Cherewyk ............... | E21B 43/26 |
| | | | | 15/104.062 |
| 8,434,549 B2 | * | 5/2013 | Cherewyk ............. | E21B 33/068 |
| | | | | 15/104.062 |

(Continued)

*Primary Examiner* — Matthew Troutman
*Assistant Examiner* — Douglas S Wood
(74) *Attorney, Agent, or Firm* — Haynes and Boone, LLP

(57) ABSTRACT

A system (e.g., an oil and/or gas production system) including a filter assembly for separating particulate materials from wellbore fluid. The filter assembly includes a flow cross and a flow bore deflector. The flow cross includes a flow block, a first passage formed in the flow block, and a second passage formed in the flow block. The first and second passages intersect. The flow bore deflector comprises a cap, an extension rod, and a deflector element. The deflector element extends at the intersection between the first and second passages to separate the particulate materials from the wellbore fluid.

21 Claims, 28 Drawing Sheets

(56) References Cited

U.S. PATENT DOCUMENTS

2002/0043507 A1\* 4/2002 McCulloch .......... B01D 21/267
210/512.1

\* cited by examiner

FILTER ASSEMBLY INCLUDING FLOW BORE DEFLECTOR

CROSS REFERENCE TO RELATED APPLICATION

This application claims the benefit of the filing date of, and priority to, U.S. Application No. 62/849,617, filed May 17, 2019, the entire disclosure of which is hereby incorporated herein by reference.

BACKGROUND

The present disclosure relates generally to filter assemblies for use in oil and gas operations and, more particularly, to a filter assembly including a flow cross and a flow bore deflector for separating particulate materials from wellbore fluid.

DETAILED DESCRIPTION

Figure 1:
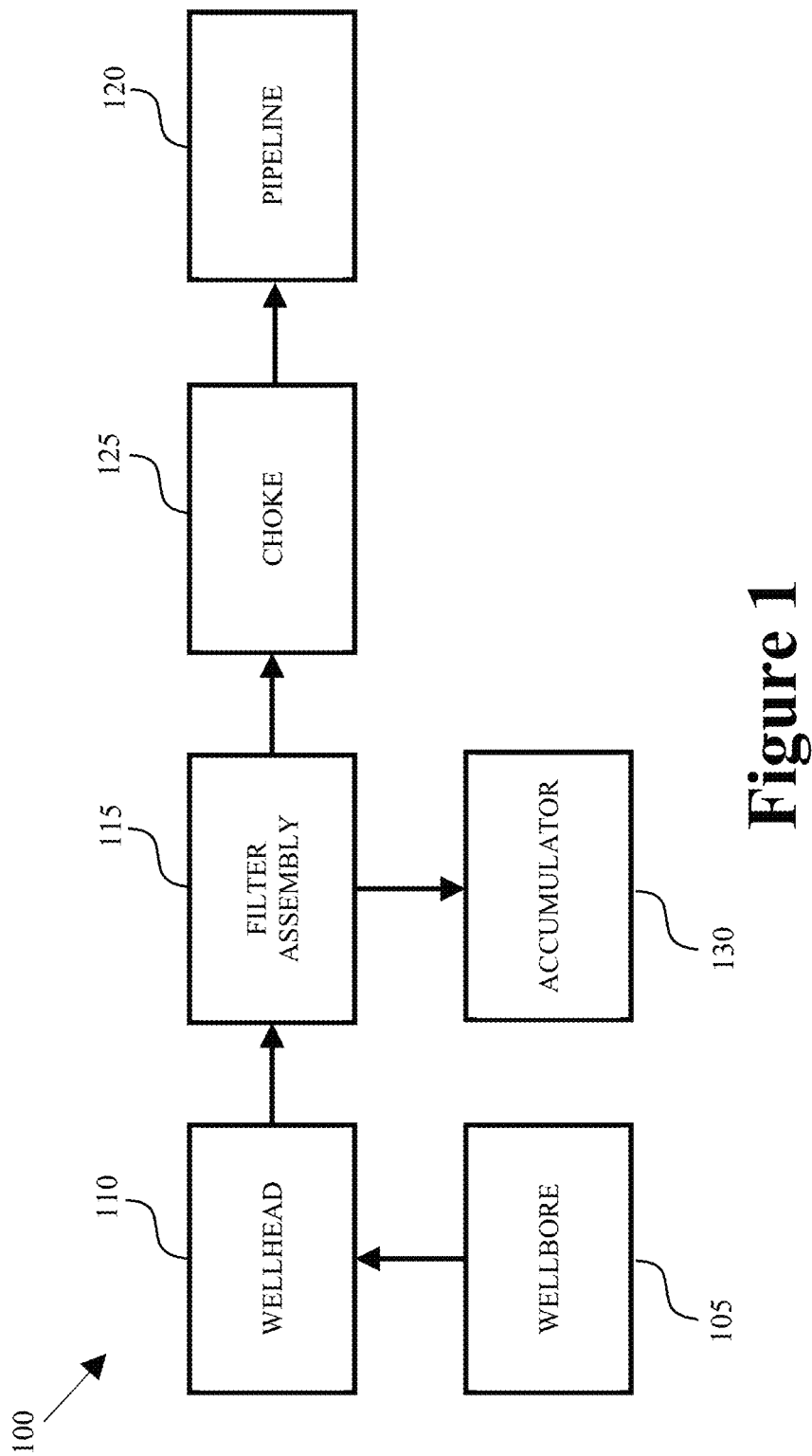
FIG. 1 is a diagrammatic illustration of an oil and/or gas production system including a filter assembly, according to one or more embodiments of the present disclosure.
Figure 2A:
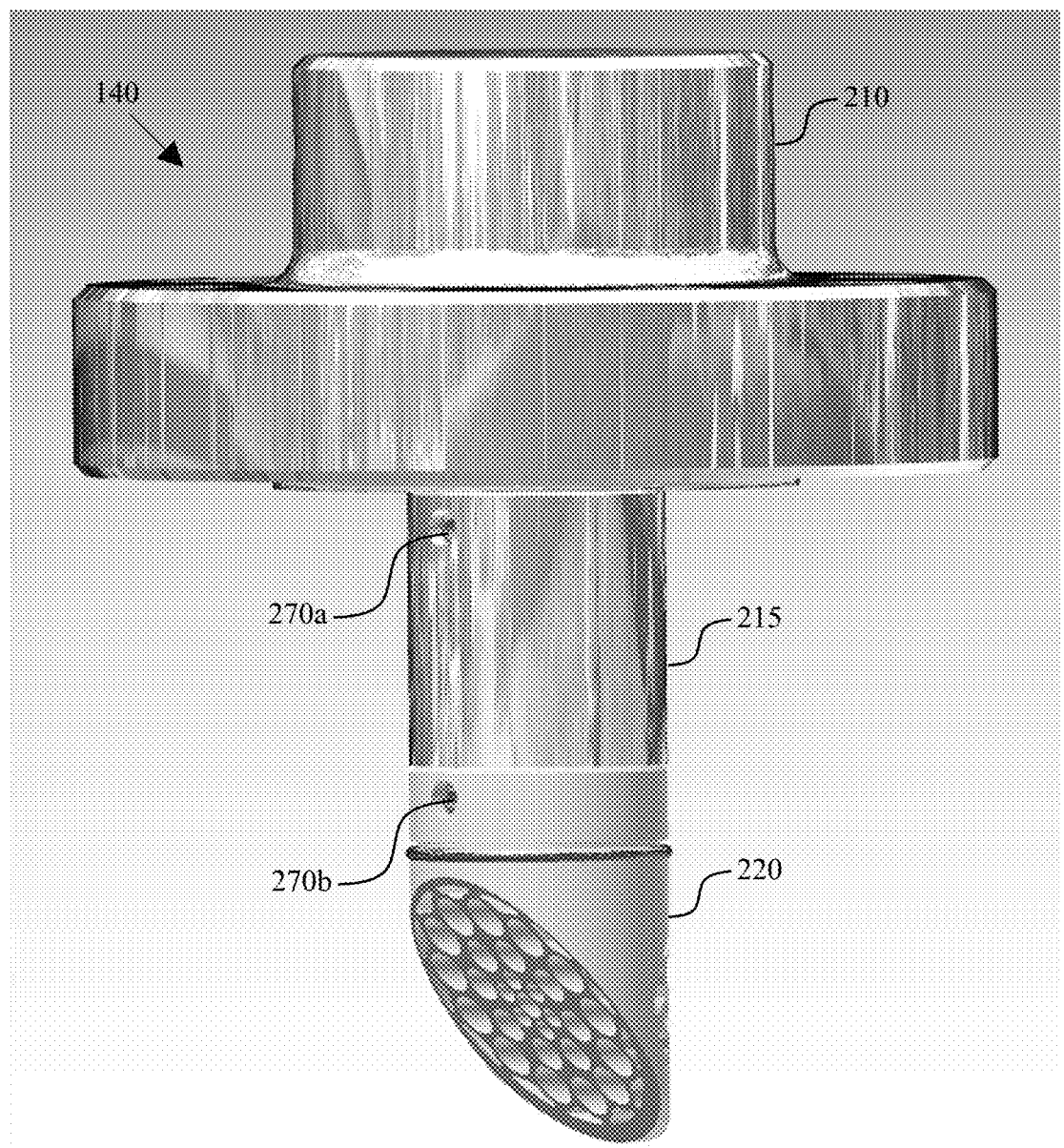
FIG. 2A is an elevational view of a flow bore deflector of the filter assembly of the oil and/or gas system of FIG. 1, according to one or more embodiments of the present disclosure.
Figure 2B:
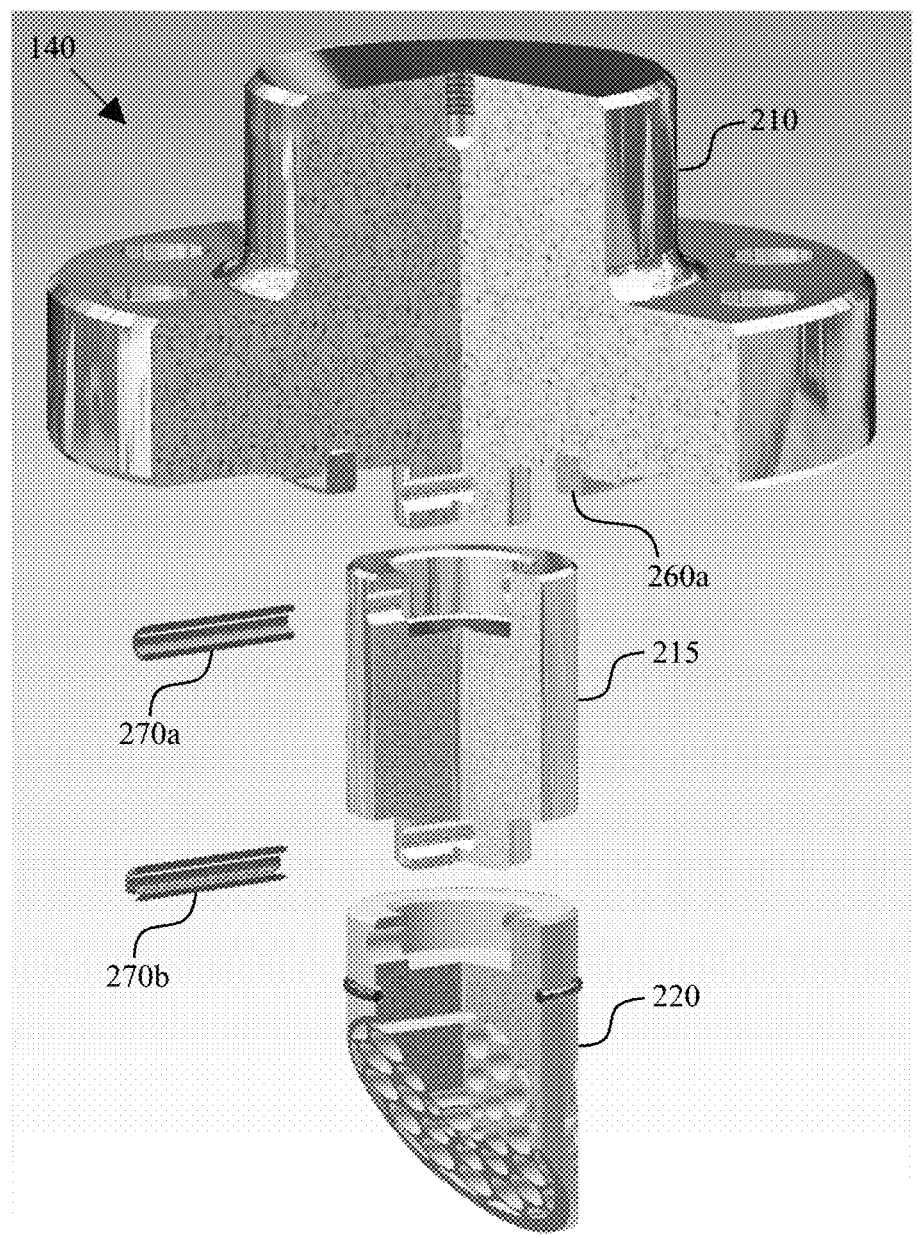
FIG. 2B is an exploded perspective sectional view of the flow bore deflector of FIG. 2A, according to one or more embodiments of the present disclosure.
Figure 2C:
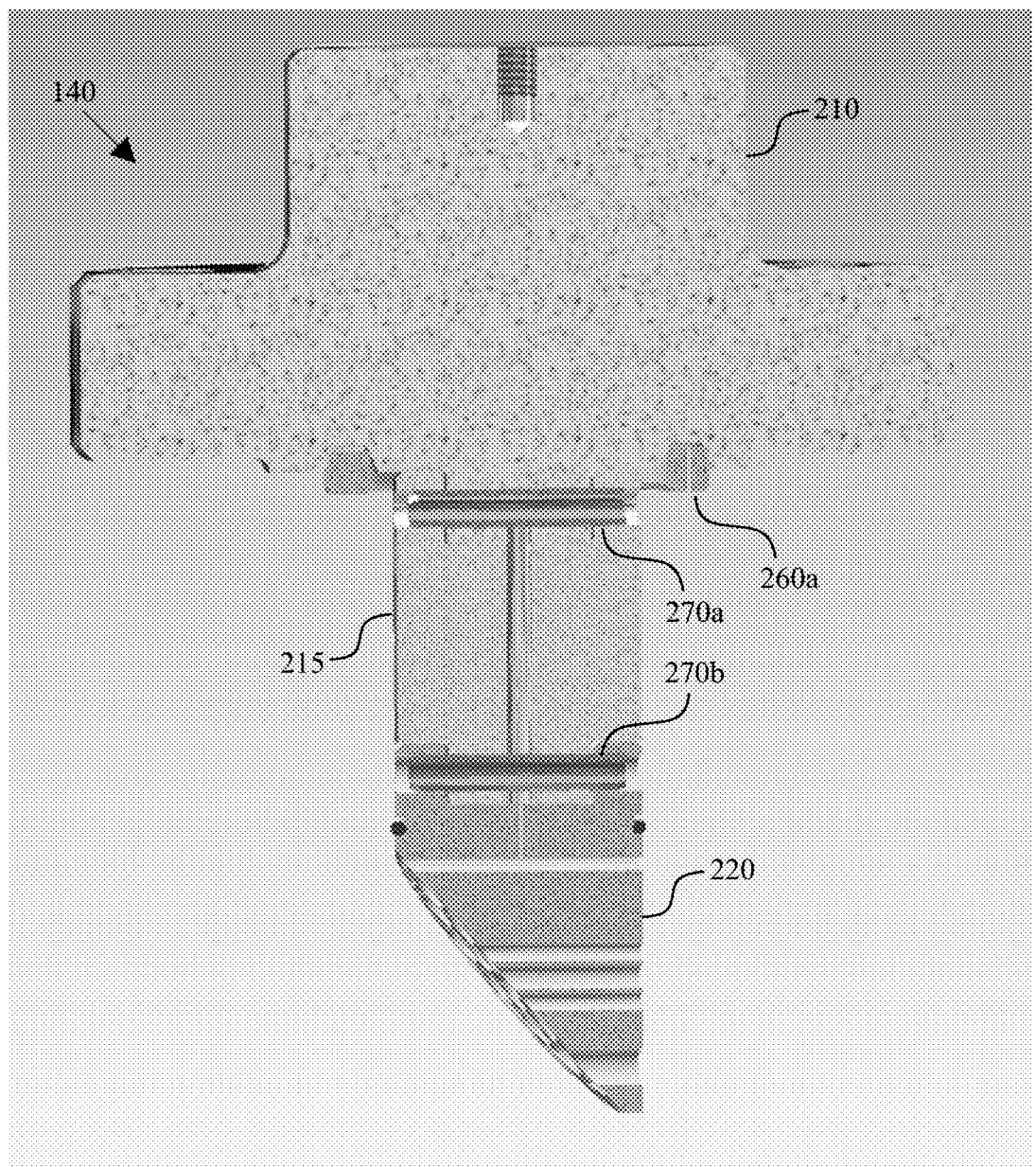
FIG. 2C is a cross-sectional view of the flow bore deflector of FIG. 2A, according to one or more embodiments of the present disclosure.
Figure 2D:
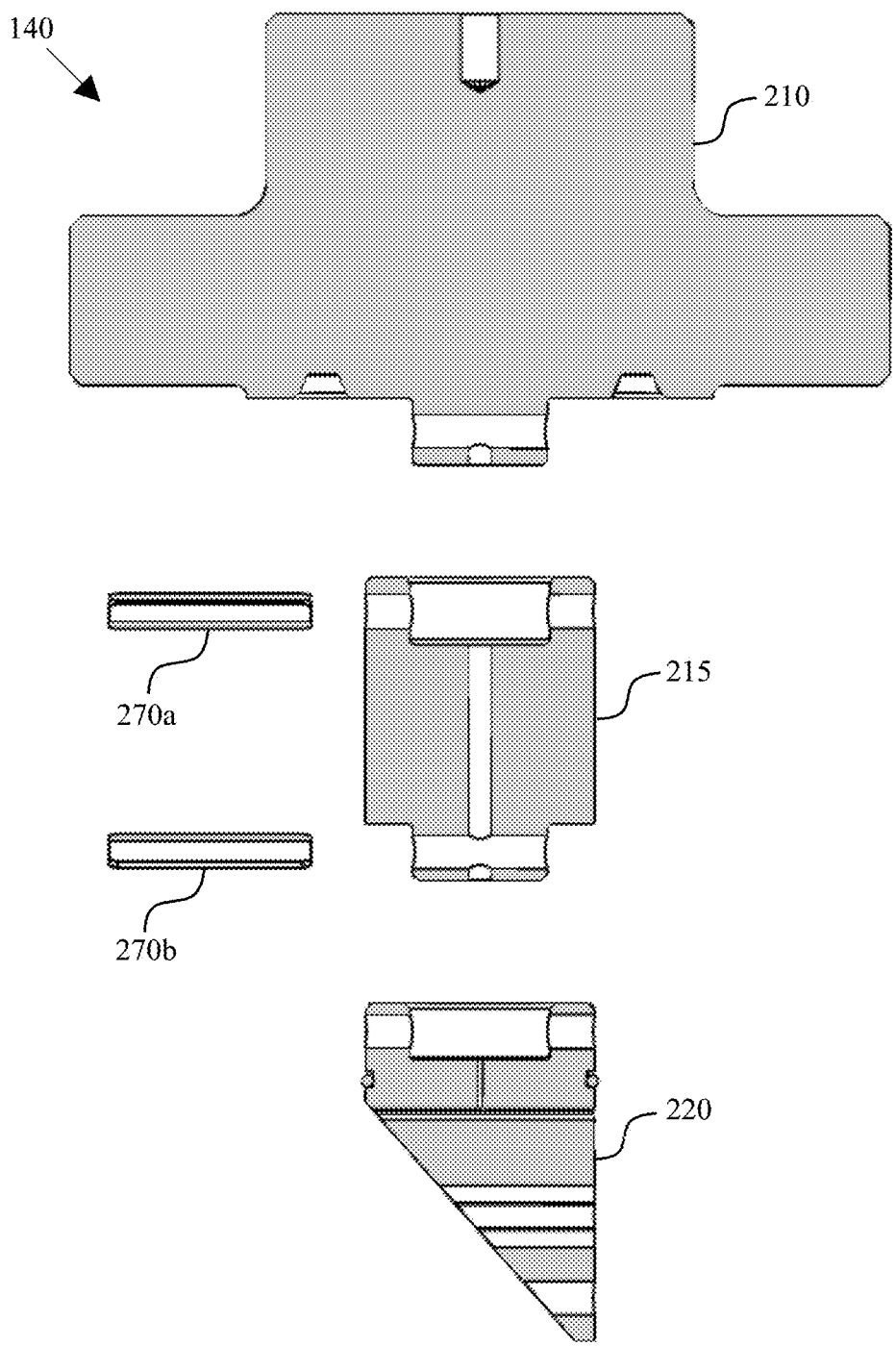
FIG. 2D is an exploded cross-sectional view of the flow bore deflector of FIG. 2A, according to one or more embodiments of the present disclosure.
Figure 3A:
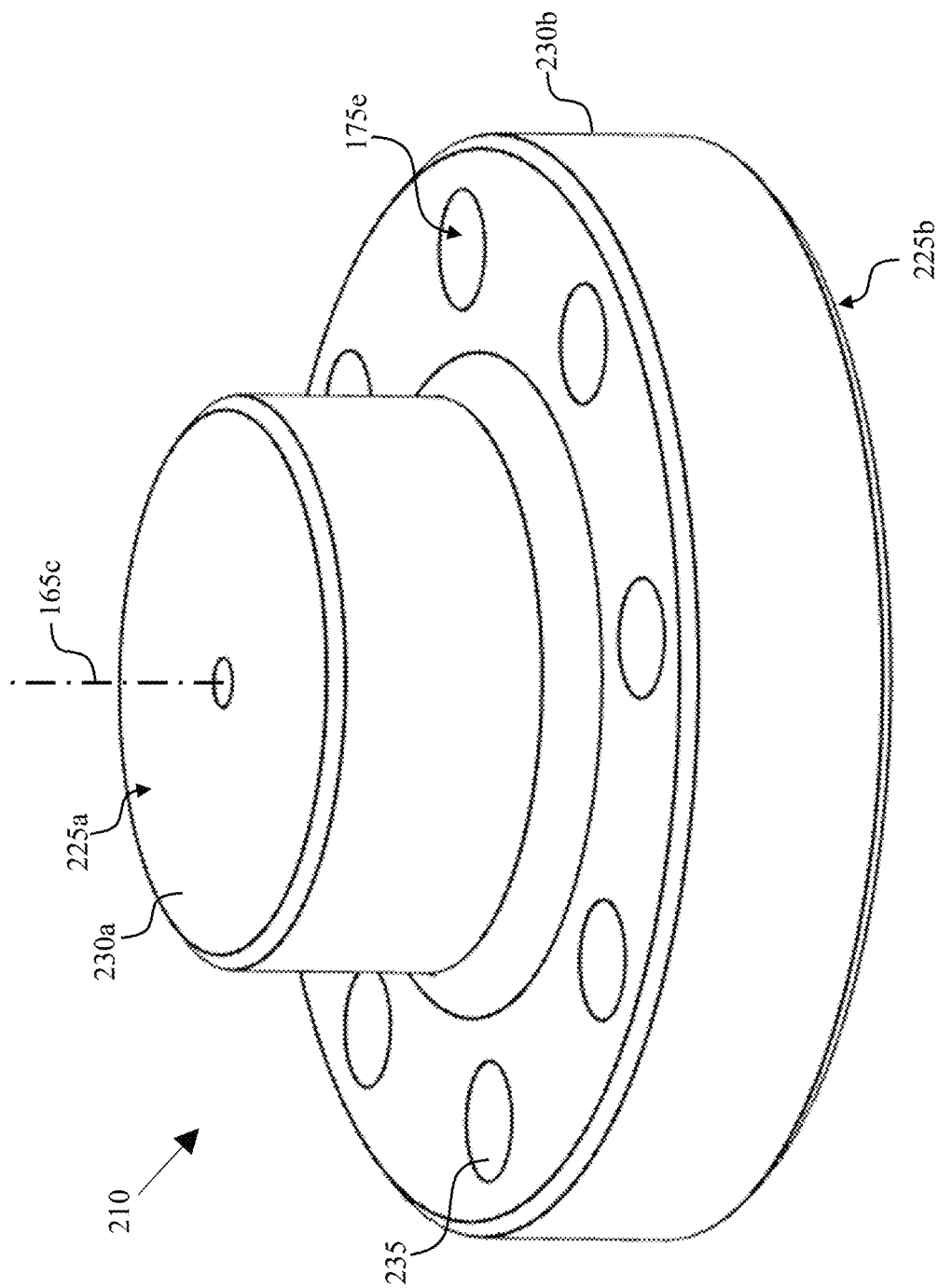
FIG. 3A is a first perspective view of a cap of the flow bore deflector of FIGS. 2A-2D, according to one or more embodiments of the present disclosure.
Figure 3B:
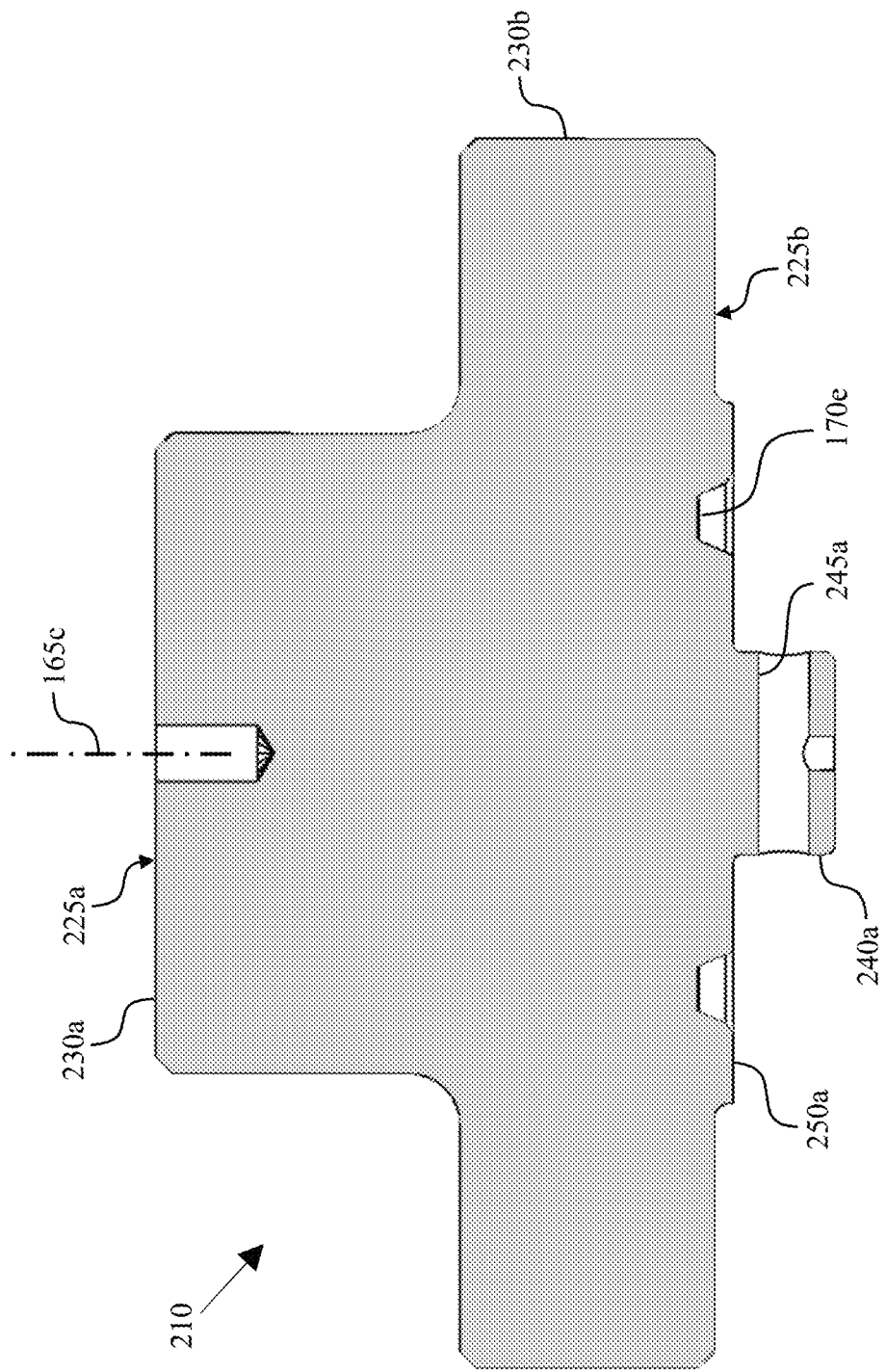
FIG. 3B is a cross-sectional view of the cap of FIG. 3A, according to one or more embodiments of the present disclosure.
Figure 3C:
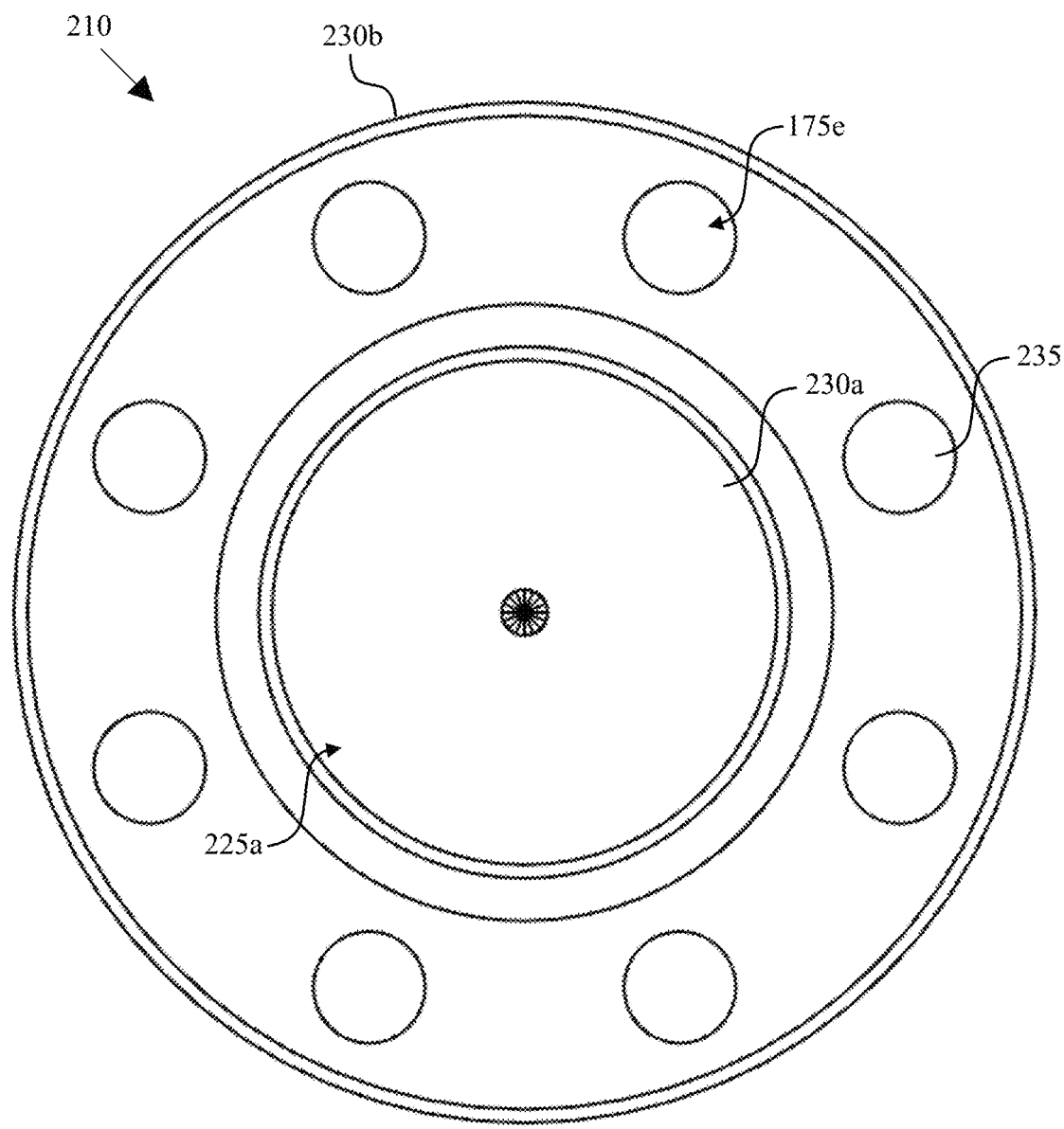
FIG. 3C is a top plan view of the cap of FIG. 3A, according to one or more embodiments of the present disclosure.
Figure 3D:
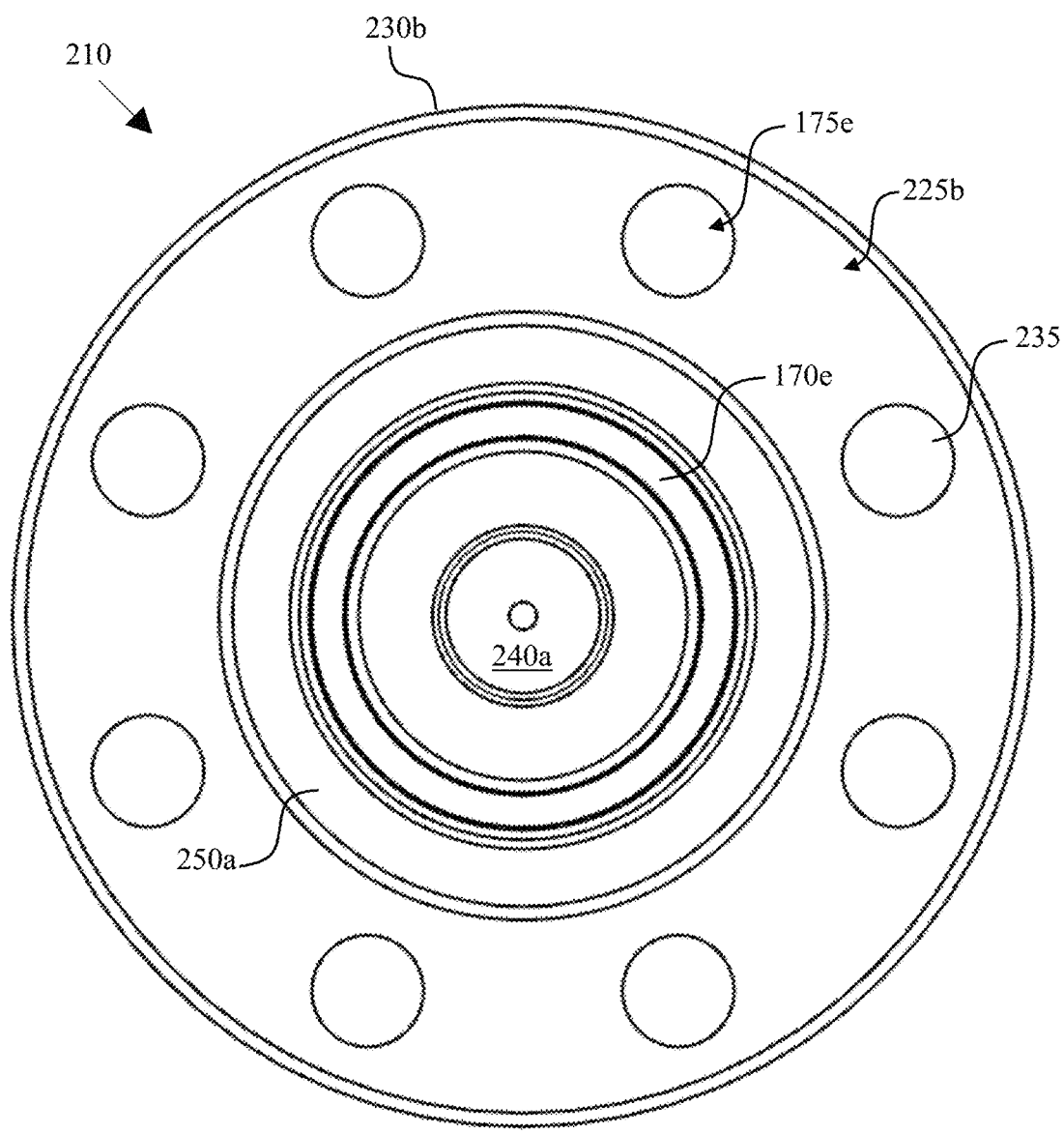
FIG. 3D is a bottom plan view of the cap of FIG. 3A, according to one or more embodiments of the present disclosure.
Figure 3E:
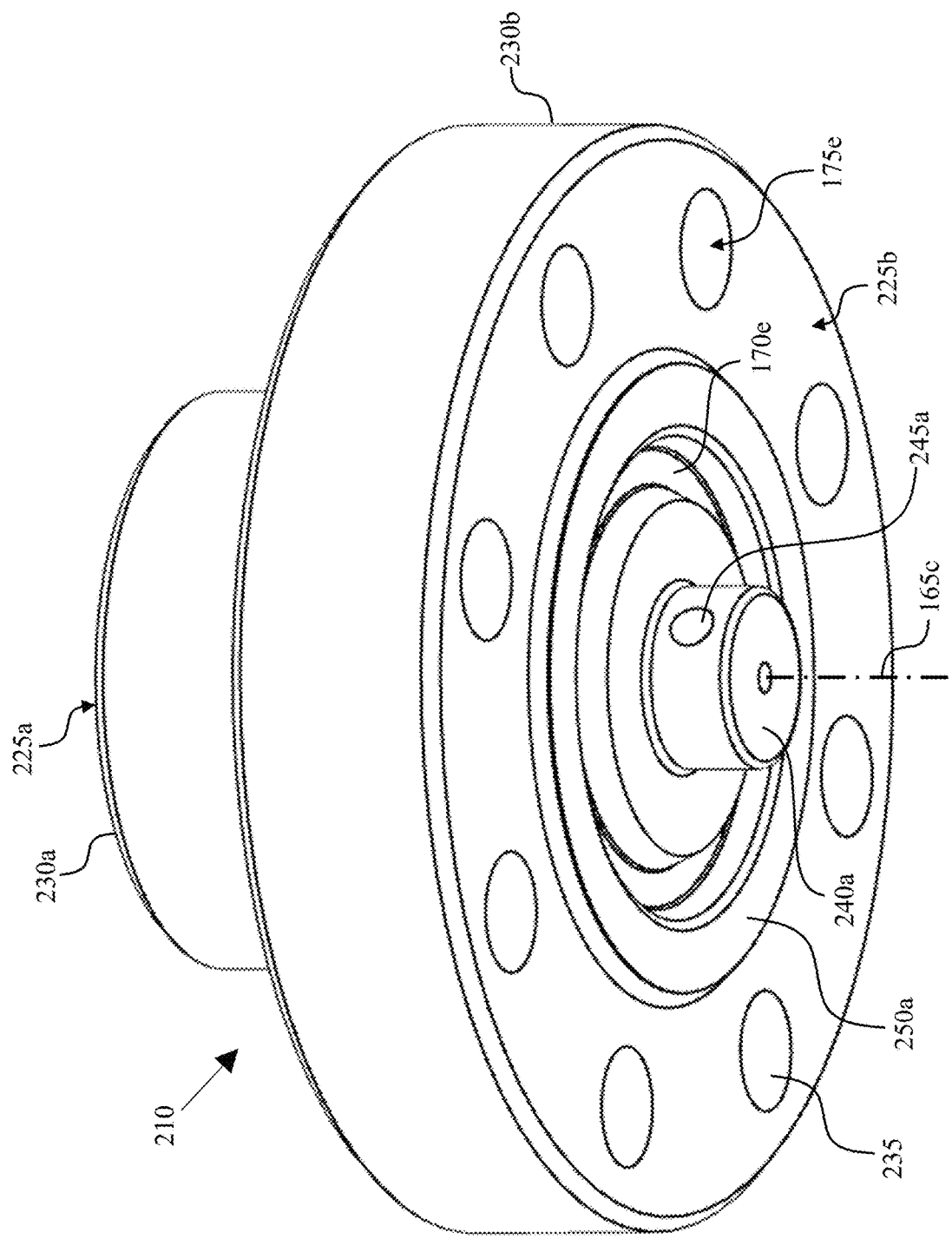
FIG. 3E is a second perspective view of the cap of FIG. 3A, according to one or more embodiments of the present disclosure.
Figure 4A:
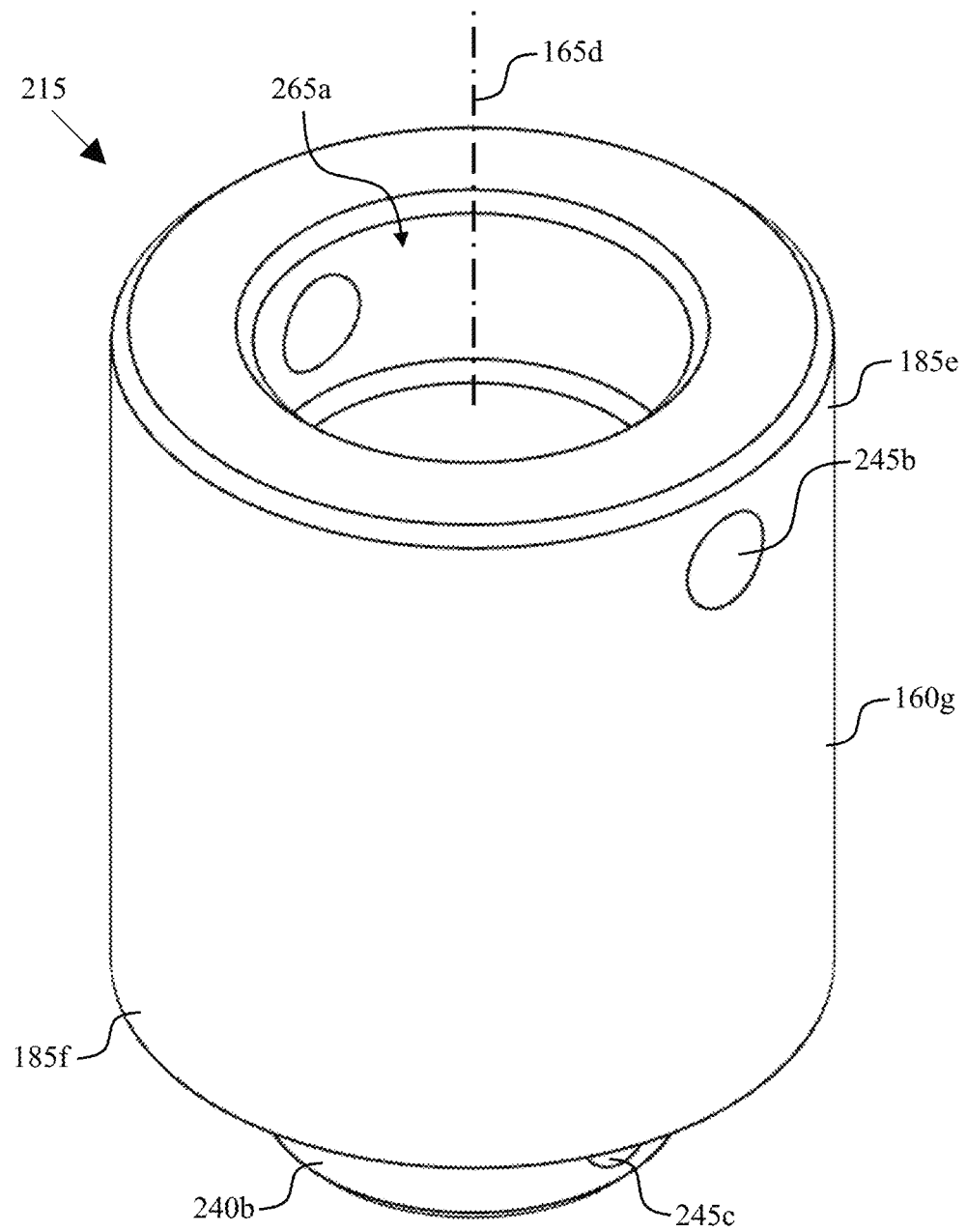
FIG. 4A is a first perspective view of an extension rod of the flow bore deflector of FIGS. 2A-2D, according to one or more embodiments of the present disclosure.
Figure 4B:
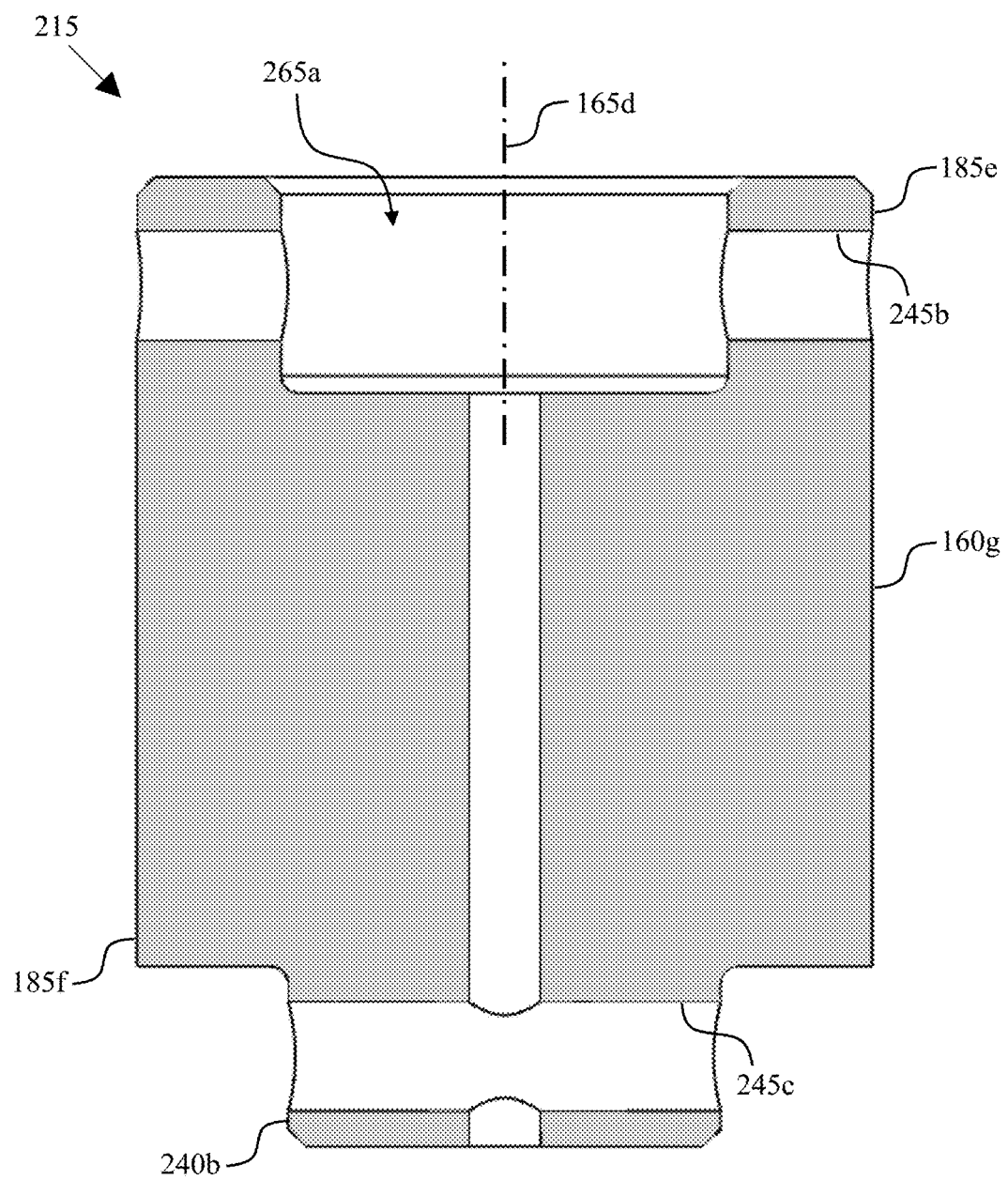
FIG. 4B is a first cross-sectional view of the extension rod of FIG. 4A, according to one or more embodiments of the present disclosure.
Figure 4C:
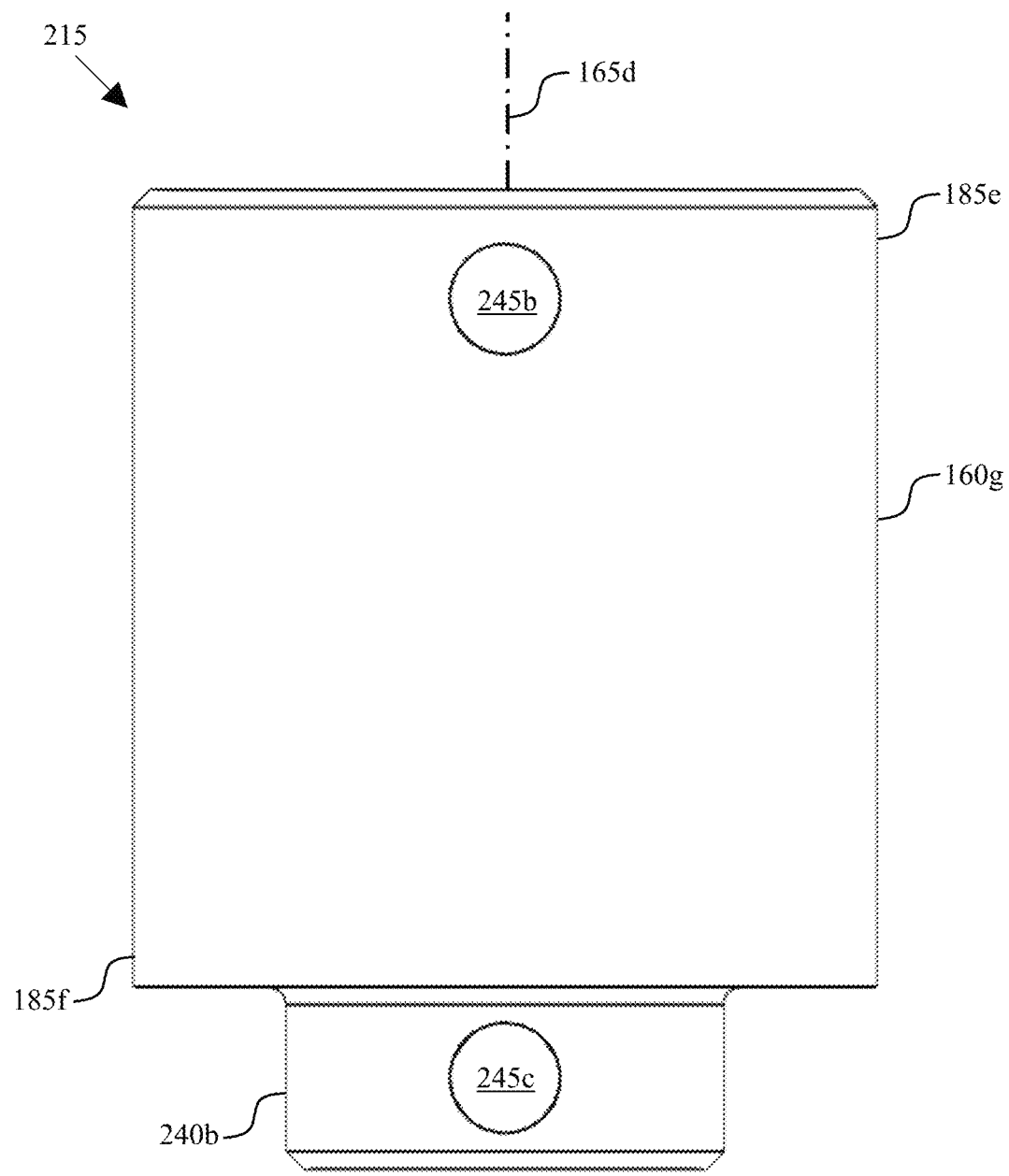
FIG. 4C is an elevational view of the extension rod of FIG. 4A, according to one or more embodiments of the present disclosure.
Figure 4D:
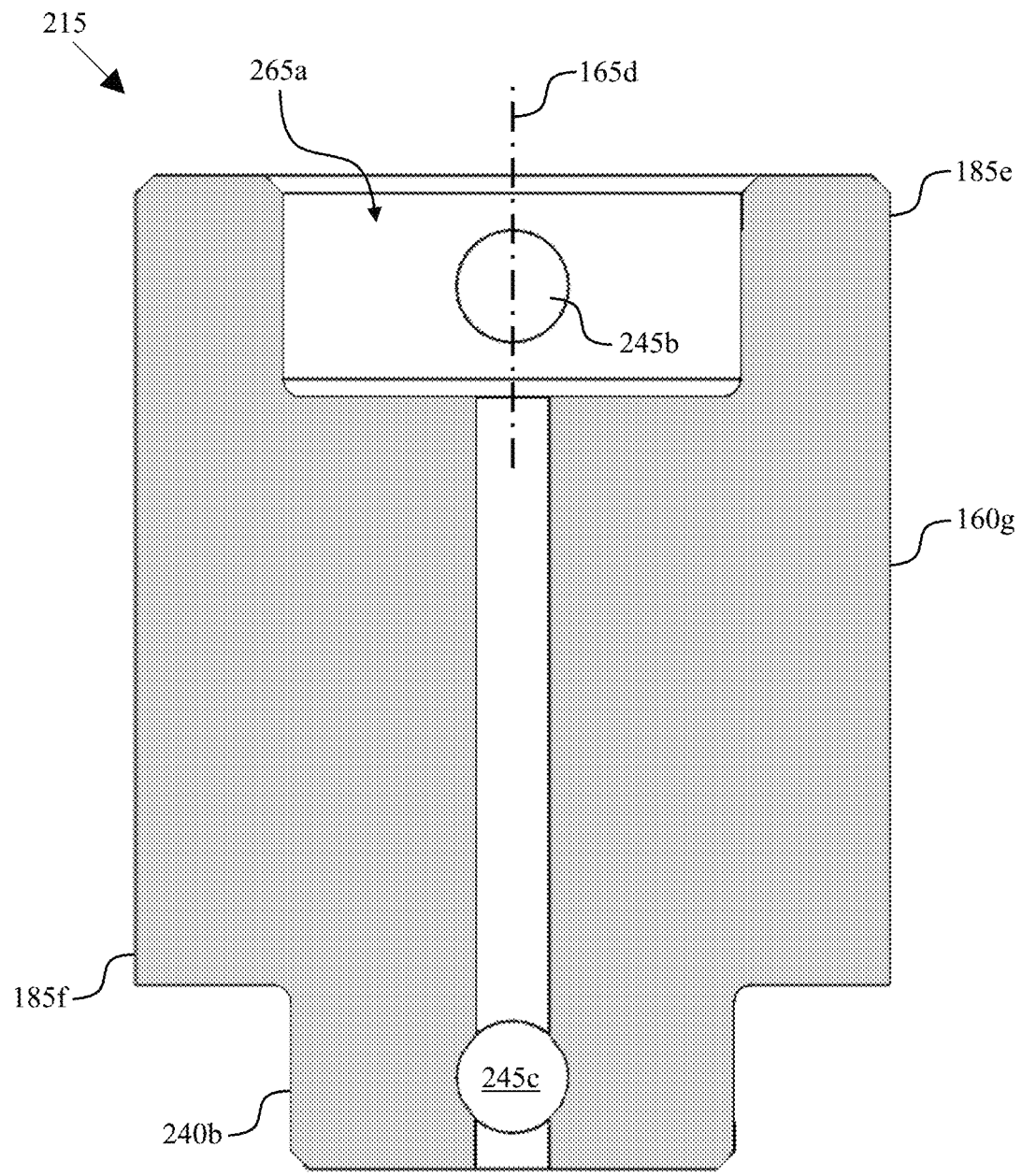
FIG. 4D is a second cross-sectional view of the extension rod of FIG. 4A, according to one or more embodiments of the present disclosure.
Figure 4E:
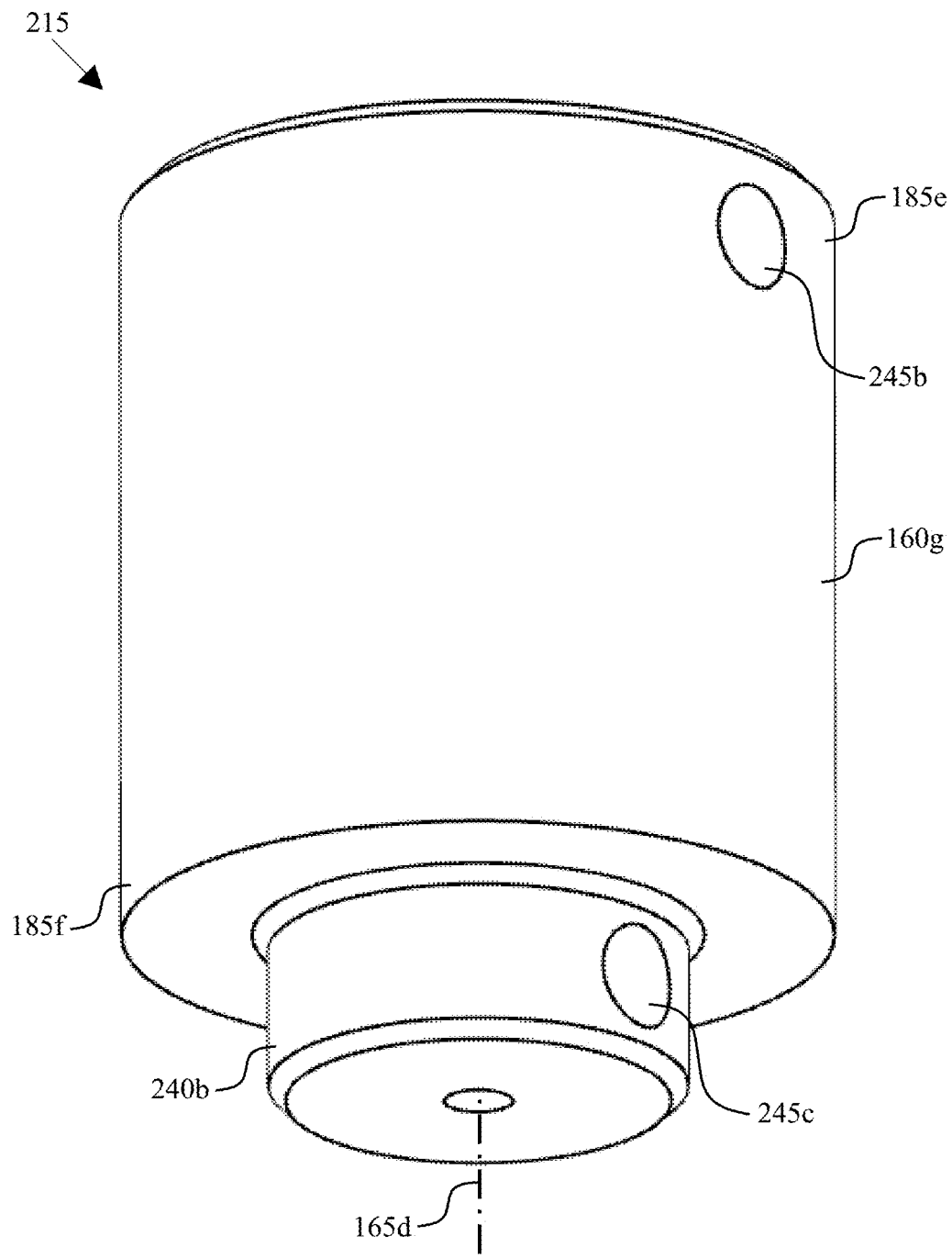
FIG. 4E is a second perspective view of the extension rod of FIG. 4A, according to one or more embodiments of the present disclosure.
Figure 5A:
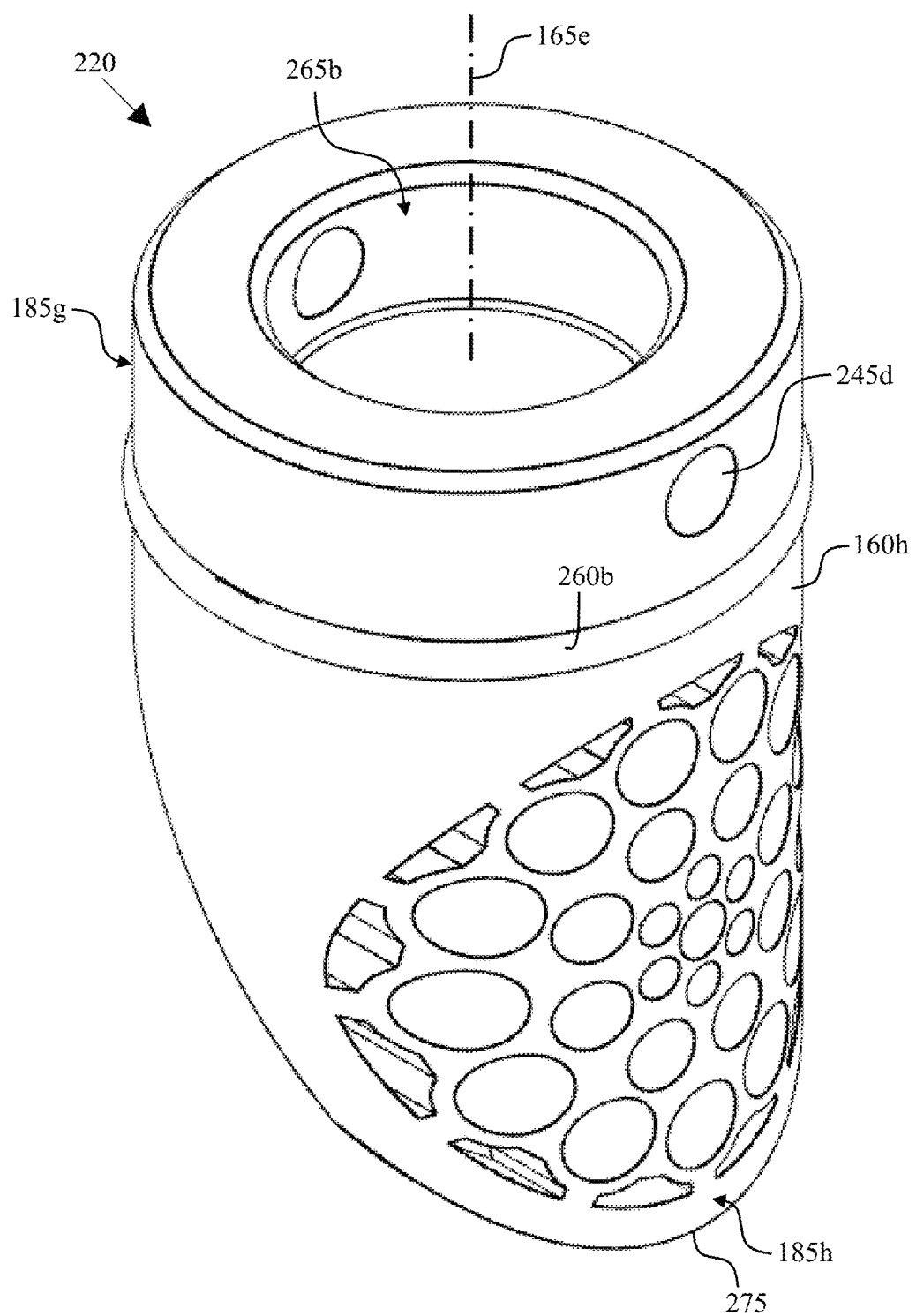
FIG. 5A is a first perspective view of a deflector element of the flow bore deflector of FIGS. 2A-2D, according to one or more embodiments of the present disclosure.
Figure 5B:
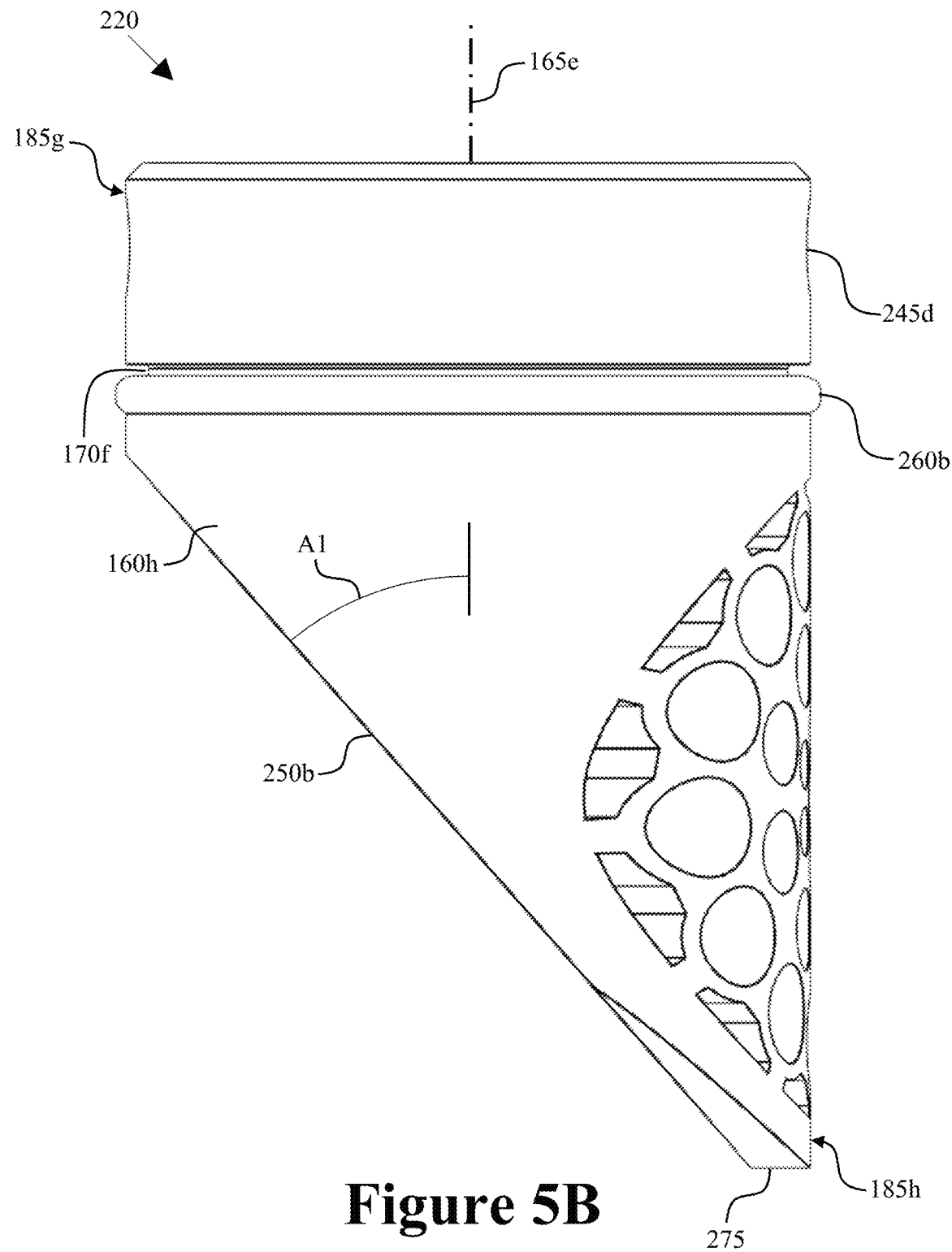
FIG. 5B is a right side elevational view of the deflector element of FIG. 5A, according to one or more embodiments of the present disclosure.
Figure 5C:
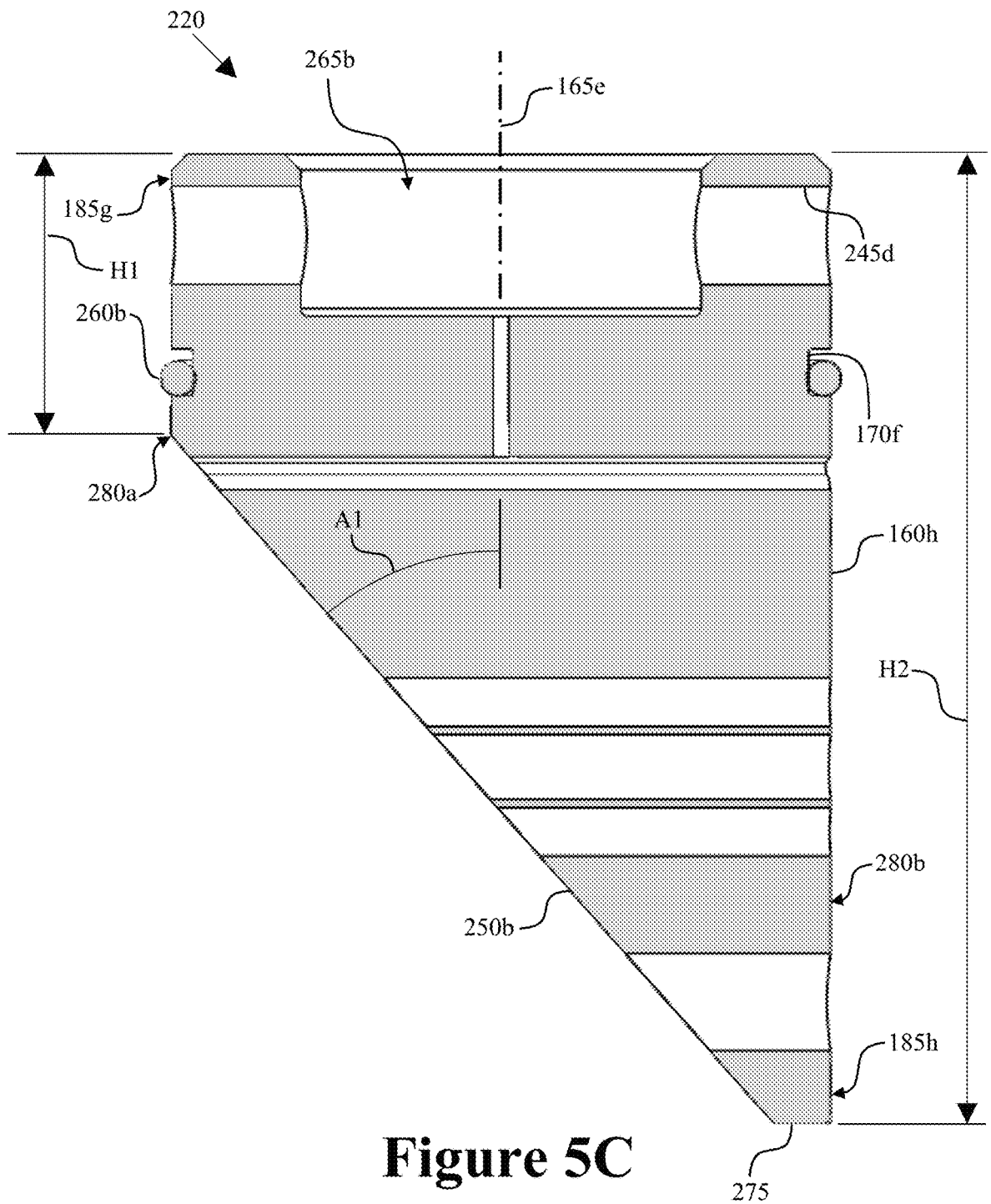
FIG. 5C is a cross-sectional view of the deflector element of FIG. 5A, according to one or more embodiments of the present disclosure.
Figure 5D:
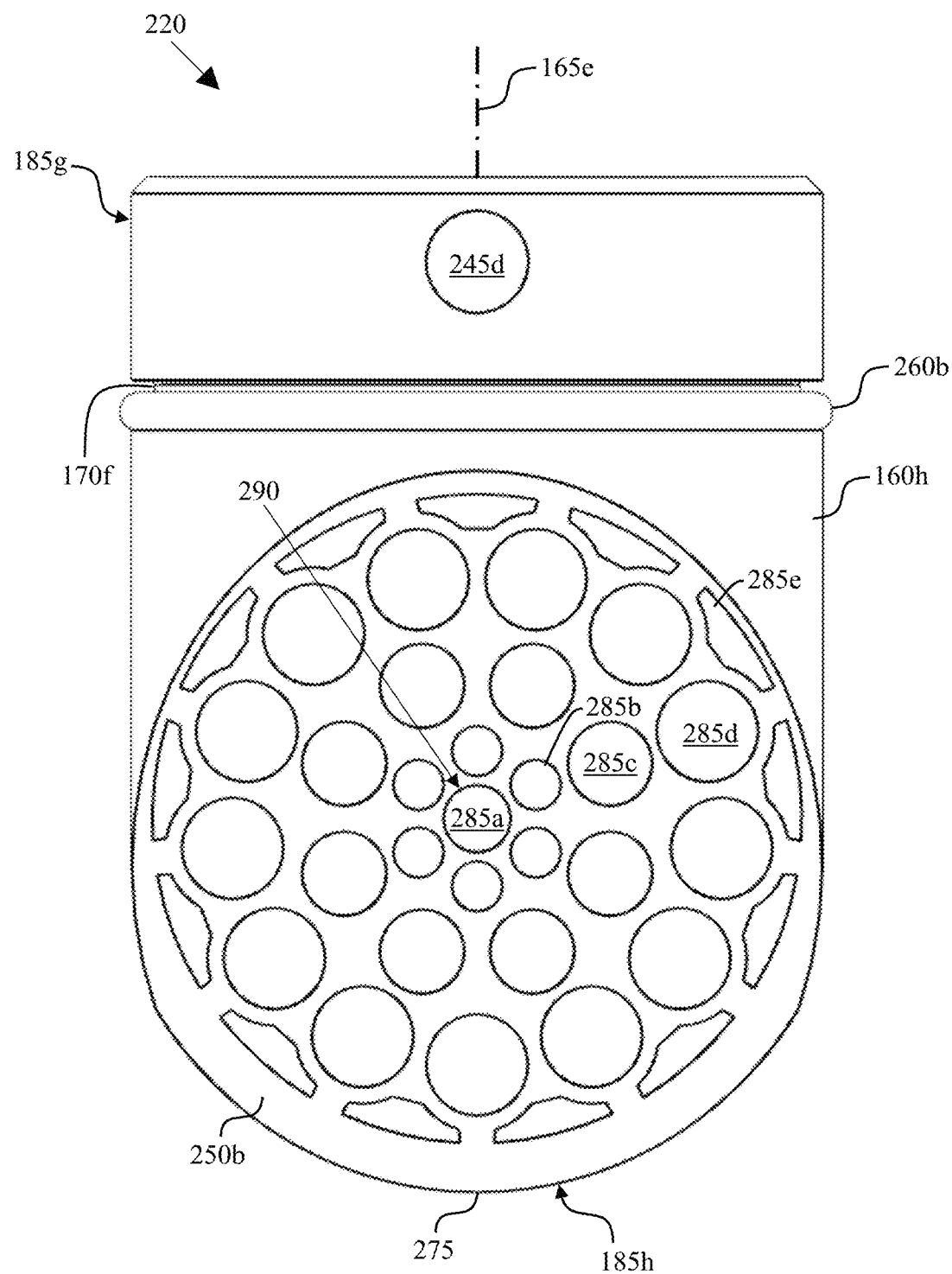
FIG. 5D is a front elevational view of the deflector element of FIG. 5A, according to one or more embodiments of the present disclosure.
Figure 5E:
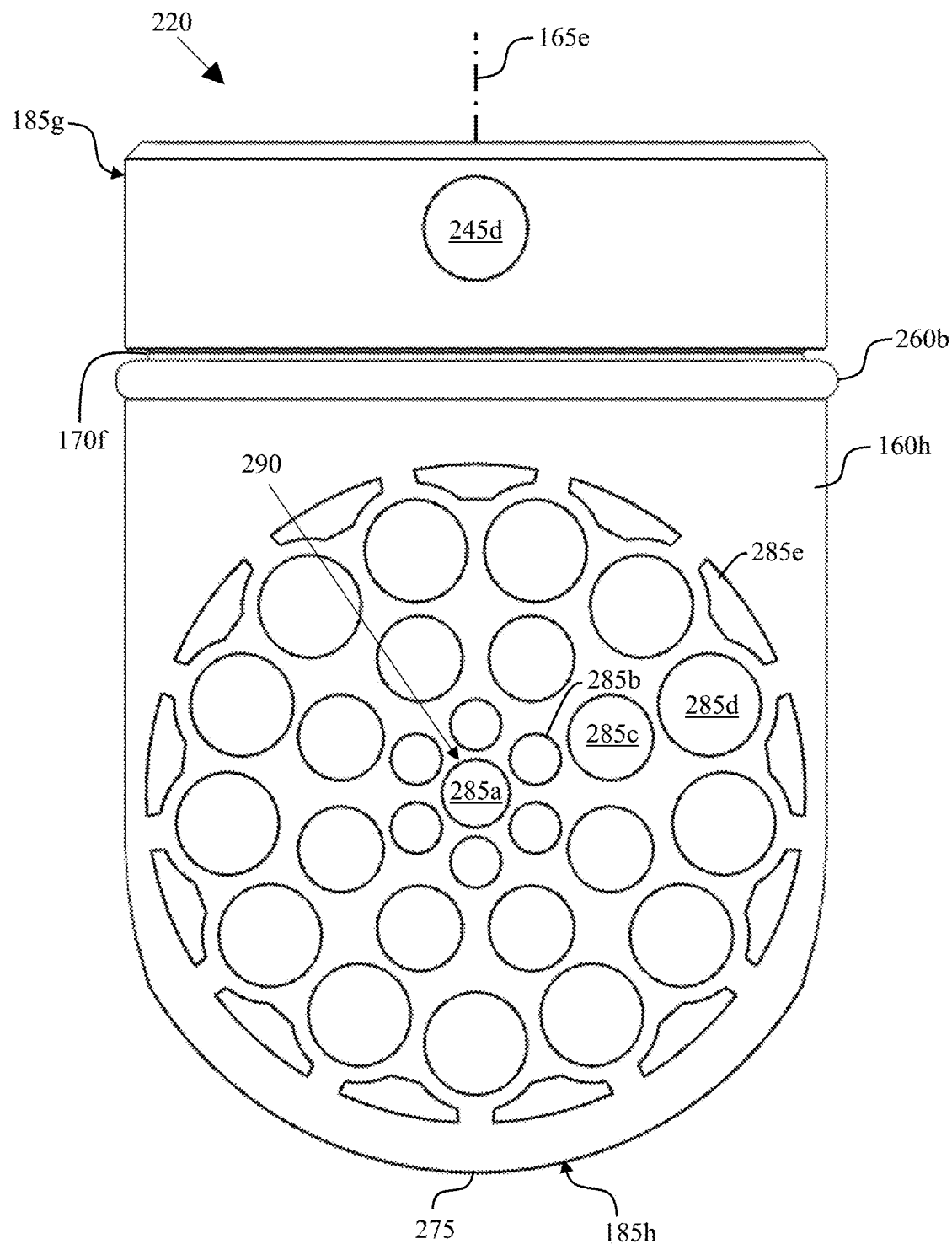
FIG. 5E is a rear elevational view of the deflector element of FIG. 5A, according to one or more embodiments of the present disclosure.
Figure 5F:
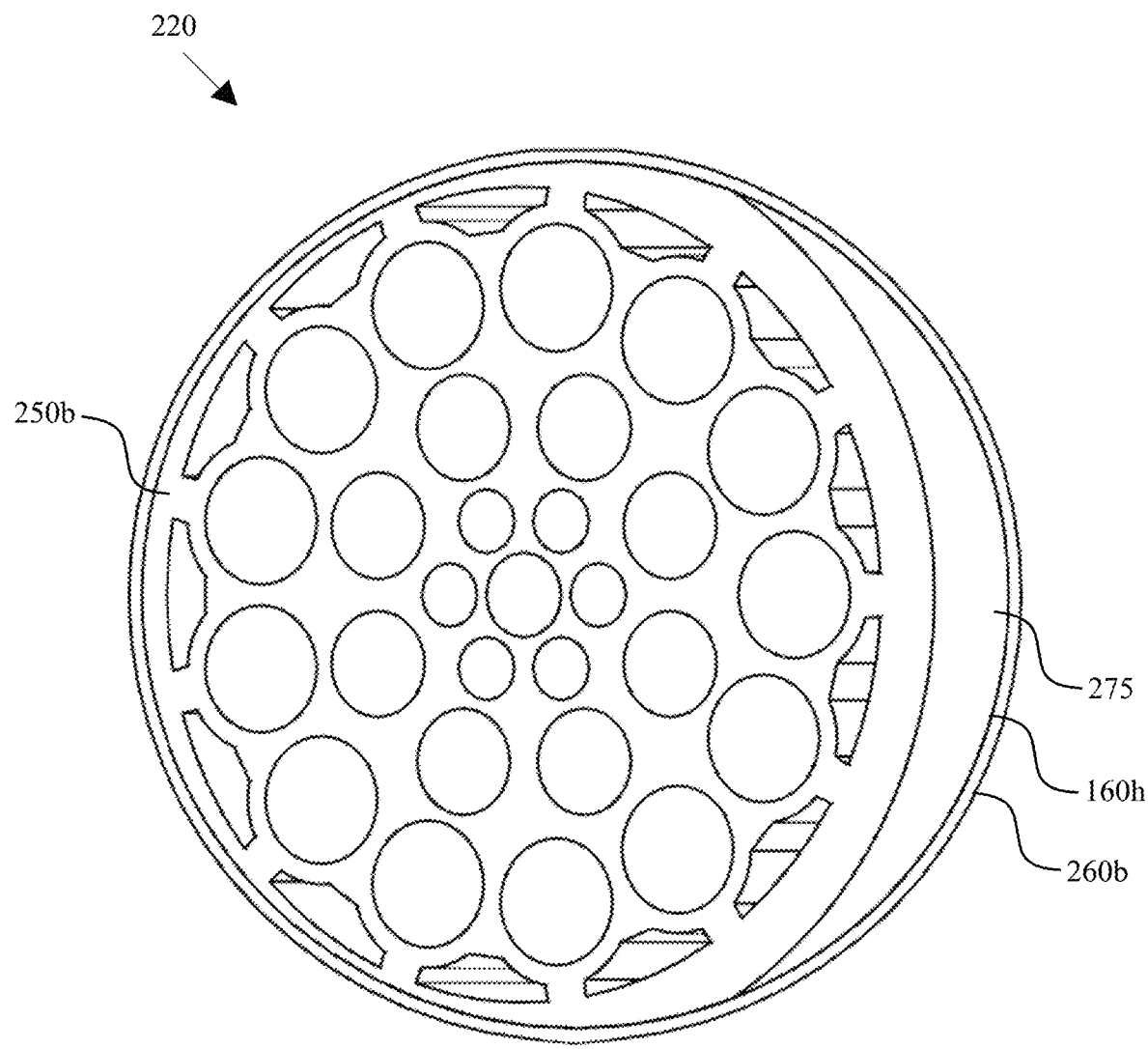
FIG. 5F is a bottom plan view of the deflector element of FIG. 5A, according to one or more embodiments of the present disclosure.
Figure 5G:
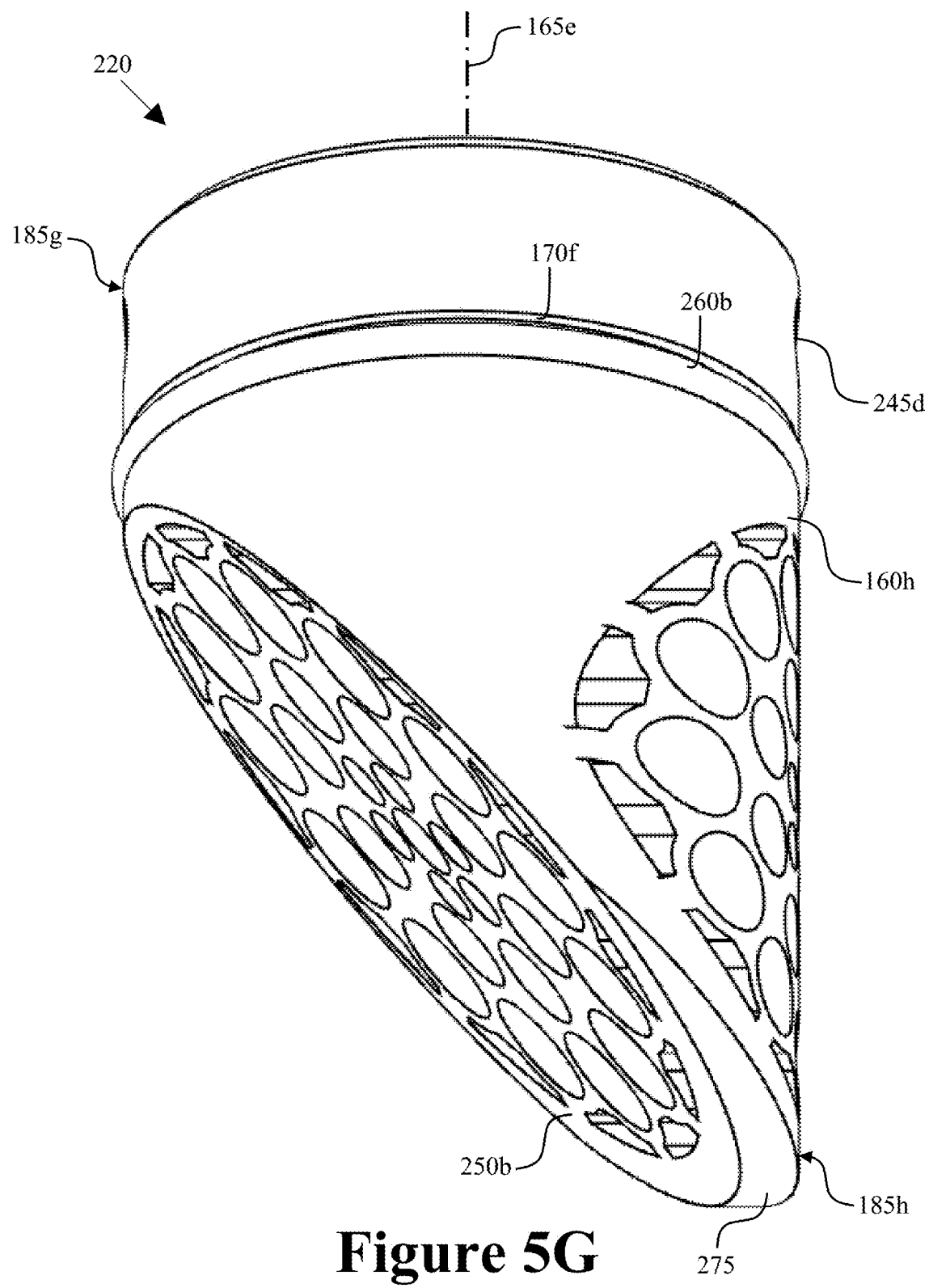
FIG. 5G is a second perspective view of the deflector element of FIG. 5A, according to one or more embodiments of the present disclosure.

Referring to FIG. 1, an oil and/or gas production system 100 is illustrated. The oil and/or gas production system 100 includes a wellbore 105, a wellhead 110, a filter assembly 115, and a pipeline 120. The wellbore 105 traverses one or more subterranean formations. A wellbore fluid (e.g., a drilling fluid, a completions fluid, a production fluid, or any combination thereof) is adapted to be received from the wellbore 105. More particularly, the wellhead 110 is adapted to receive the wellbore fluid from the wellbore 105. The wellhead 110 serves as the surface termination of the wellbore 105. A choke 125 is adapted to receive the wellbore fluid from the wellhead 110 and to adjust the flow of the wellbore fluid exiting the wellhead 110. The pipeline 120 is adapted to receive the wellbore fluid after the wellbore fluid exits the choke 125. The pipeline 120 is adapted to transport the wellbore fluid for further processing to other equipment (e.g., a tank battery), another facility (e.g., a customer facility), a sales channel, or any combination thereof. The filter assembly 115 is operably coupled between the wellhead 110 and the choke 125 and is adapted to remove particulate materials from the wellbore fluid, as will be described in further detail below. Removal of the particulate materials from the wellbore fluid prevents, or at least reduces, the choke 125 from becoming clogged by the particulate materials. An accumulator 130 is operably coupled to the filter assembly 115 and is adapted to accumulate the particulate materials removed from the wellbore fluid by the filter assembly 115. In several embodiments, the accumulator 130 is part of the filter assembly 115. In several embodiments, the accumulator 130 may be, include, be part of, be referred to as, or be replaced by a reservoir and/or some other container.

Figure 7:
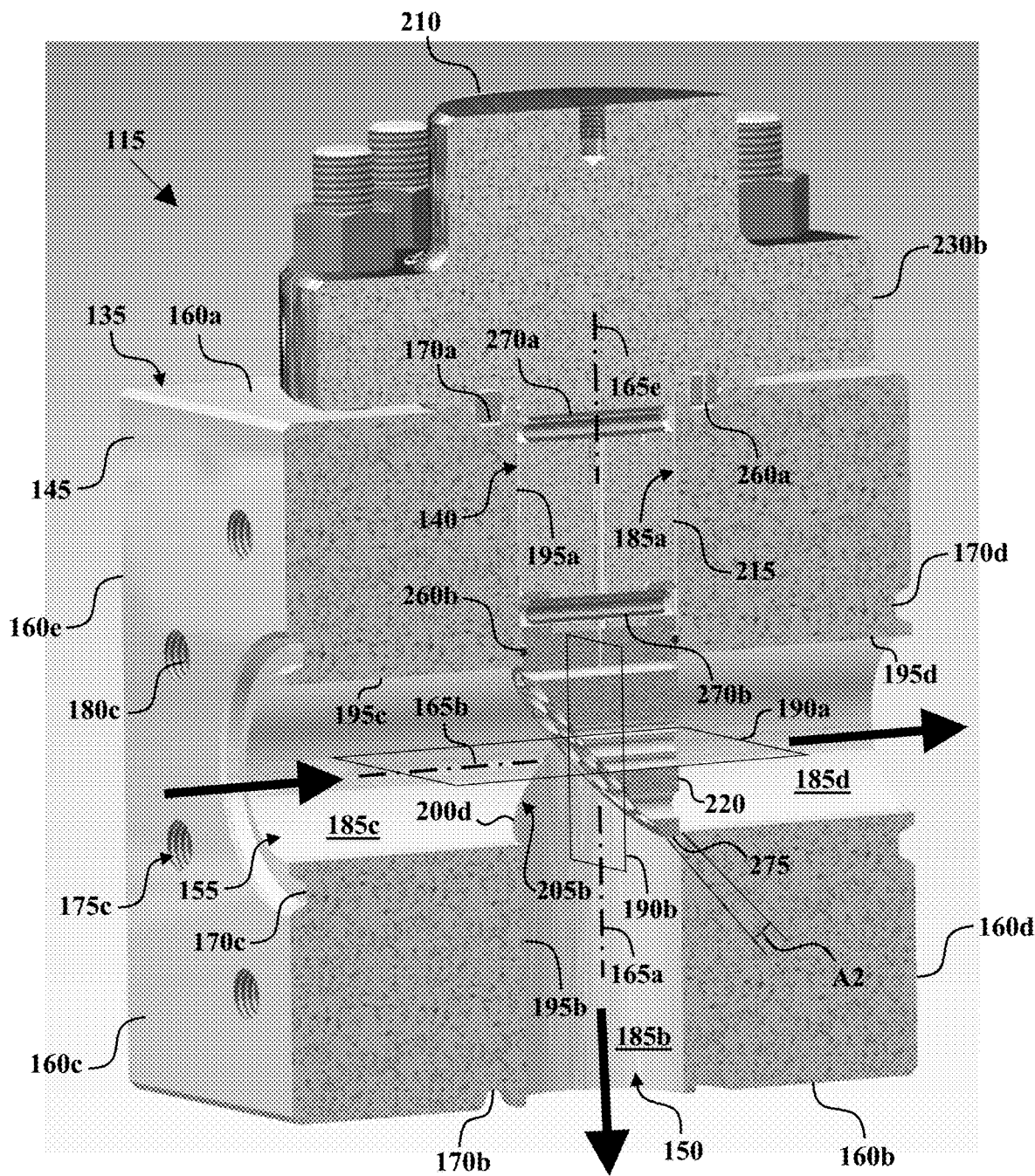
FIG. 7 is a cross-sectional view of the filter assembly of FIG. 1 including the blow bore deflector of FIGS. 2A-2D, according to one or more embodiments of the present disclosure.

Turning briefly to FIG. 7, the filter assembly 115 includes a flow cross 135 and a flow bore deflector 140. The flow cross 135 includes a flow block 145, a first passage 150 formed in the flow block 145, and a second passage 155 formed in the flow block 145. The flow block 145 is a rectangular prism. For example, the flow block 145 may be a cube. The flow block 145 defines first and second opposing exterior surfaces 160a and 160b, third and fourth opposing exterior surfaces 160c and 160d, and fifth and sixth opposing exterior surfaces 160e and 160f (the sixth exterior surface 160f is not visible in FIG. 7). In several embodiments, the first and second opposing exterior surfaces 160a and 160b are spaced in a parallel relation. In several embodiments, the third and fourth opposing exterior surfaces 160c and 160d are spaced in a parallel relation. In several embodiments, the third and fourth opposing exterior surfaces 160c and 160d are spaced in a perpendicular relation with the first and second opposing exterior surfaces 160a and 160b. In several embodiments, the fifth and sixth opposing exterior surfaces 160e and 160f are spaced in a parallel relation. In several embodiments, the fifth and sixth opposing exterior surfaces 160e and 160f are spaced in a perpendicular relation with the first and second opposing exterior surfaces 160a and 160b. In several embodiments, the fifth and sixth opposing exterior surfaces 160e and 160f are spaced in a parallel relation with the third and fourth opposing exterior surfaces 160c and 160d. The first passage 150 is formed through the flow block 145, including the first and second opposing exterior surfaces 160a and 160b, along a first longitudinal center axis 165a. The second passage 155 is formed through the flow block 145, including the third and fourth opposing exterior surfaces 160c and 160d, along a second longitudinal center axis 165b. The first and second passages 150 and 155 intersect. In several embodiments, the first and second passages 150 and 155 are spaced in a perpendicular relation. In several embodiments, the first and second longitudinal center axes 165a and 165b intersect. In several embodiments, the first and second longitudinal center axes 165a and 165b are spaced in a perpendicular relation. In several embodiments, the flow cross 135 is a four-way flow cross. Alternatively, a five- or six-way flow cross may be used with the fifth and/or sixth opposing exterior surfaces 160e and/or 160f being capped off.

A first annular groove 170a is formed in the first exterior surface 160a around the first passage 150. A first bolt hole circle 175a (not visible in FIG. 7) includes a first plurality of threaded-holes 180a (not visible in FIG. 7) formed in the first exterior surface 160a and around the first annular groove 170a. Further, a second annular groove 170b is formed in the second exterior surface 160b around the first passage 150. A second bolt hole circle 175b (not visible in FIG. 7) includes a second plurality of threaded-holes 180b (not visible in FIG. 7) formed in the second exterior surface 160b and around the second annular groove 170b. Further still, a third annular groove 170c is formed in the third exterior surface 160c around the second passage 155. A third bolt hole circle 175c includes a third plurality of threaded-holes 180c formed in the third exterior surface 160c and around the third annular groove 170c. Finally, a fourth annular groove 170d is formed in the fourth exterior surface 160d around the second passage 155. A fourth bolt hole circle 175d (not visible in FIG. 7) includes a fourth plurality of threaded-holes 180d (not visible in FIG. 7) formed in the fourth exterior surface 160d and around the fourth annular groove 170d.

The first passage 150 includes opposing first and second end portions 185a and 185b. The opposing first and second end portions 185a and 185b are separated by a first plane 190a. In several embodiments, the first plane 190a is perpendicular to the first longitudinal center axis 165a along which the first passage 150 extends. In several embodiments, the second longitudinal center axis 165b along which the second passage 155 extends lies in the first plane 190a. The first end portion 185a of the first passage 150 has a first diameter D1 and defines a first interior surface 195a of the flow block 145. In several embodiments, the first interior surface 195a is cylindrical. The second end portion 185b of the first passage 150 has a second diameter D2 and defines a second interior surface 195b of the flow block 145. In several embodiments, the second interior surface 195b is cylindrical. In several embodiments, the first and second diameters D1 and D2 are equal.

The second passage 155 includes opposing third and fourth end portions 185c and 185d. The opposing third and fourth end portions 185c and 185d are separated by a second plane 190b. In several embodiments, the second plane 190b is perpendicular to the second longitudinal center axis 165b along which the second passage 155 extends. In several embodiments, the first longitudinal center axis 165a along which the first passage 150 extends lies in the second plane 190b. The third end portion 185c of the second passage 155 has a third diameter D3 and defines a third interior surface 195c of the flow block 145. In several embodiments, the third interior surface 195c is cylindrical. The fourth end portion 185d of the second passage 155 has a fourth diameter D4 and defines a fourth interior surface 195d of the flow block 145. In several embodiments, the fourth interior surface 195d is cylindrical. In several embodiments, the third and fourth diameters D3 and D4 are equal. In several embodiments, the first and second diameters D1 and D2 are larger than the third and fourth diameters D3 and D4. In several embodiments, the third and fourth diameters D3 and D4 are larger than the first and second diameters D1 and D2.

The first and third interior surfaces 195a and 195c, respectively, intersect to form a first semielliptical ridge 200a (not visible in FIG. 7) of the flow block 145. The second and fourth interior surfaces 195b and 195d, respectively, intersect to form a second semielliptical ridge 200b (not visible in FIG. 7) of the flow block 145. The first and second semielliptical ridges 200a and 200b together form a first elliptical ridge 205a (not visible in FIG. 7) of the flow block 145. The first and fourth interior surfaces 195a and 195d, respectively, intersect to form a third semielliptical ridge 200c (not visible in FIG. 7) of the flow block 145. The second and third interior surfaces 195b and 195c, respectively, intersect to form a fourth semielliptical ridge 200d in the flow block 145. The third and fourth semielliptical ridges 200c and 200d together form a second elliptical ridge 205b (partially visible in FIG. 7) in the flow block 145.

Referring to FIGS. 2A-2D, the flow bore deflector 140 includes a cap 210, an extension rod 215, and a deflector element 220. Referring to FIGS. 3A-3D with continuing reference to FIGS. 2A-2D, the cap 210 extends along a third longitudinal center axis 165c and defines opposing first and second side portions 225a and 225b. A central portion 230a extends from a flanged portion 230b, at the first side portion 225a of the cap 210, along the third longitudinal center axis 165c. The flanged portion 230b extends radially outward from the central portion 230a. A fifth bolt hole circle 175e includes a plurality of through-holes 235 formed through the flanged portion 230b and around the central portion 230a. A first hitch 240a extends from the second side portion 225b of the cap 210 along the third longitudinal center axis 165c. A first pin hole 245a is formed through the first hitch 240a. In several embodiments, the first pin hole 245a extends perpendicular to the third longitudinal center axis 165c. A first end face 250a is defined in the cap 210 at the second side portion 225b. The first end face 250a is raised in relation to the flanged portion 230b. A fifth annular groove 170e is formed in the first end face 250a around the first hitch 240a. A first sealing element 260a (shown in FIGS. 2B, 2C, and 7) is adapted to extend within the fifth annular groove 170e formed in the cap 210 and the first annular groove 170a (shown in FIG. 7) formed in the flow block 145. The first sealing element 260a is adapted to sealingly engage the cap 210 and the flow block 145, as will be described in further detail below.

Referring to FIGS. 4A-4E with continuing reference to FIGS. 2A-2D, the extension rod 215 extends along a fourth longitudinal center axis 165d and defines a seventh exterior surface 160g and opposing fifth and sixth end portions 185e and 185f. In several embodiments, the seventh exterior surface 160g is cylindrical. A first pocket 265a is formed in the fifth end portion 185e along the fourth longitudinal center axis 165d. A second pin hole 245b is formed through the extension rod 215. The second pin hole 245b intersects the first pocket 265a. In several embodiments, the second pin hole 245b extends perpendicular to the fourth longitudinal center axis 165d. The first hitch 240a of the cap 210 is adapted to extend within the first pocket 265a of the extension rod 215. When the first hitch 240a of the cap 210 extends within the first pocket 265a of the extension rod 215, a first pin 270a (shown in FIGS. 2A-2D and 7) is adapted to extend through the second pin hole 245b of the extension rod 215 and the first pin hole 245a of the first hitch 240a to couple the extension rod 215 to the cap 210. In several embodiments, the first pin 270a is a coil pin. A second hitch 240b extends from the sixth end portion 185f of the extension rod 215. A third pin hole 245c is formed through the second hitch 240b. In several embodiments, the third pin hole 245c extends perpendicular to the fourth longitudinal center axis 165d.

Referring to FIGS. 5A-5G with continuing reference to FIGS. 2A-2D, the deflector element 220 extends along a fifth longitudinal center axis 165e and defines an eighth exterior surface 160h and opposing seventh and eighth end portions 185g and 185h. In several embodiments, the deflector element 220 is made of or includes tungsten carbide. In several embodiments, the eighth exterior surface 160h is cylindrical. A second pocket 265b is formed in the seventh end portion 185g along the fifth longitudinal center axis 165e. A fourth pin hole 245d is formed through the deflector element 220. The fourth pin hole 245d intersects the second pocket 265b. In several embodiments, the fourth pin hole 245d extends perpendicular to the fifth longitudinal center axis 165e. The second hitch 240b of the extension rod 215 is adapted to extend within the second pocket 265b of the deflector element 220. When the second hitch 240b of the extension rod 215 extends within the second pocket 265b of the deflector element 220, a second pin 270b (shown in FIGS. 2A-2D and 7) is adapted to extend through the fourth pin hole 245d of the deflector element 220 and the third pin hole 245c of the extension rod 215 to couple the deflector element 220 to the extension rod 215. In several embodiments, the second pin 270b is a coil pin. A sixth annular groove 170f is formed in the eighth exterior surface 160h of the deflector element 220. A second sealing element 260b is adapted to extend within the sixth annular groove 170f formed in the deflector element 220. The second sealing element 260b is adapted to sealingly engage the deflector element 220 and the flow block 145, as will be described in further detail below.

Figure 6:
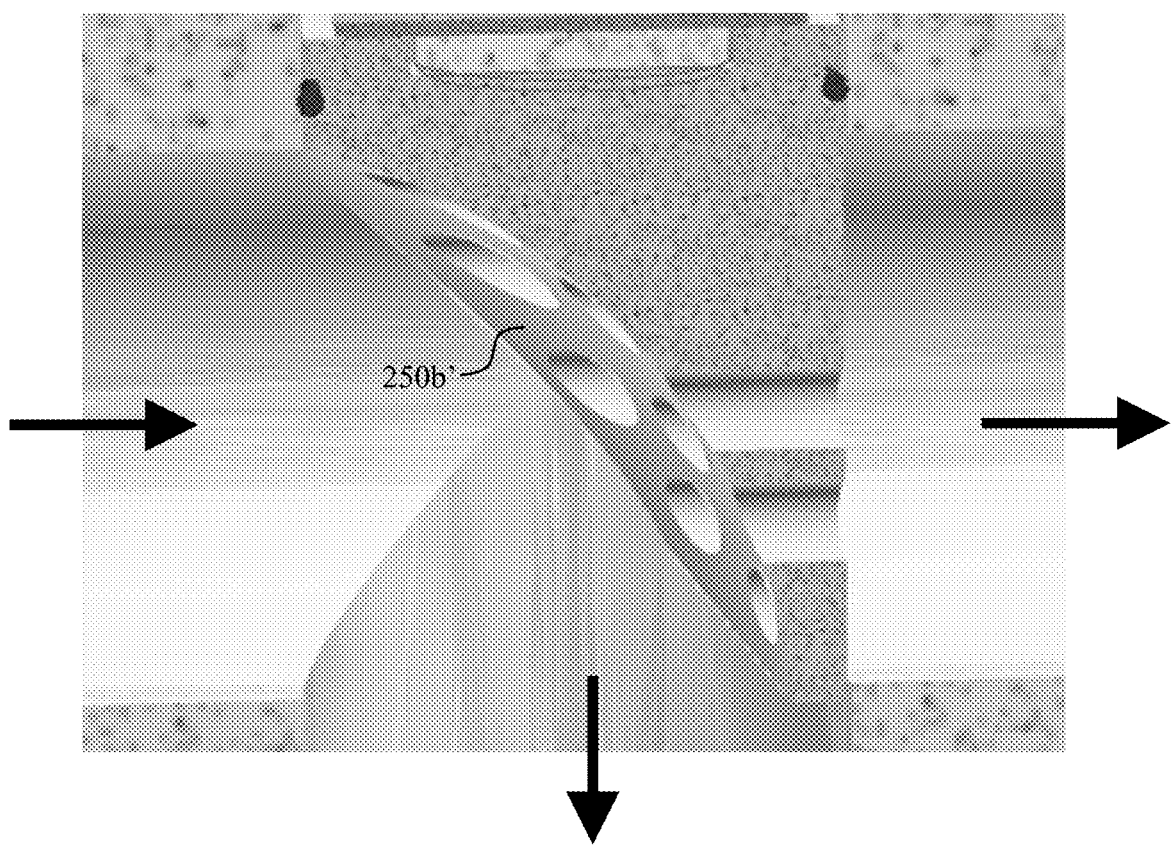
FIG. 6 is an enlarged cross-sectional view of a filter assembly including another deflector element, according to one or more embodiments of the present disclosure.

The eighth end portion 185h of the deflector element 220 defines a second end face 250b. The eighth end portion 185h of the deflector element 220 is wedge-shaped so as to define a distal tip portion 275. In several embodiments, the deflector element 220 is truncated to form the second end face 250b. In several embodiments, the second end face 250b is planar, as shown in FIGS. 5A-5G. The second end face 250b extends at a first angle A1 relative to the fifth longitudinal center axis 165e. In several embodiments, the first angle A1 is approximately 40 degrees (+/−5 degrees). In several embodiments the first angle A1 is 38 degrees. In addition, or instead, the second end face 250b (or a portion thereof) may be nonplanar. For example, the second end face 250b may be concave, as shown in FIG. 6 (and referred to by reference numeral 250b'). In several embodiments, the second end face 250b is spherical. Turning back to FIGS. 5A-5G, the deflector element 220 defines a leading portion 280a (shown in FIG. 5C) along the eighth exterior surface 160h. The deflector element 220 has a first height H1 (shown in FIG. 5C) at the leading portion 280a. In several embodiments, the first height H1 is a minimal height of the deflector element 220. The leading portion 280a is adapted to extend within or adjacent the third end portion 185c of the second passage 155. In several embodiments, the leading portion 280a is adapted to be coplanar with the second longitudinal center axis 165b along which the second passage 155 extends. In several embodiments, the leading portion 280a is adapted to lie within a plane perpendicular to both the first plane 190a that separates the opposing first and second end portions 185a and 185b of the first passage 150 and the second plane 190b that separates the opposing third and fourth end portions 185c and 185d of the second passage 155. The deflector element 220 defines a trailing portion 280b along the eighth exterior surface 160h opposite the leading portion 280a. The deflector element 220 has a second height H2 at the trailing portion 280b. In several embodiments, the second height H2 is a maximal height of the deflector element 220. The trailing portion 280b is adapted to extend within the fourth end portion 185d of the second passage 155. In several embodiments, the trailing portion 280b is adapted to be coplanar with the second longitudinal center axis 165b along which the second passage 155 extends. In several embodiments, the trailing portion 280b is adapted to lie within the plane perpendicular to both the first plane 190a that separates the opposing first and second end portions 185a and 185b of the first passage 150 and the second plane 190b that separates the opposing third and fourth end portions 185c and 185d of the second passage 155.

A first through-hole 285a (shown in FIGS. 5D and 5E) is formed through the deflector element 220, including the second end face 250b and the eighth exterior surface 160h, perpendicular to the fifth longitudinal center axis 165e. In several embodiments, the first through-hole 285a is cylindrical. Alternatively, the first through-hole 285a may be noncylindrical. In several embodiments, the first through-hole 285a extends through a central portion 290 of the second end face 250b. In several embodiments, the first through-hole 285a has a diameter of ¼-inch. In several embodiments, the first through-hole 285a is omitted and replaced with multiple through-holes distributed around the central portion 290 of the second end face 250b.

Second through-holes 285b (shown in FIGS. 5D and 5E) are also formed through the deflector element 220, including the second end face 250b and the eighth exterior surface 160h, perpendicular to the fifth longitudinal center axis 165e. In several embodiments, the second through-holes 285b are cylindrical. Alternatively, the second through-holes 285b may be noncylindrical. The second through-holes 285b are distributed around the first through-hole 285a. In several embodiments, the second through-holes 285b are concentrically distributed around the first through-hole 285a. In several embodiments, the second through-holes 285b are evenly distributed around the first through-hole 285a. In several embodiments, the second through-holes 285b each have a diameter of 3/16-inch.

Third through-holes 285c (shown in FIGS. 5D and 5E) are also formed through the deflector element 220, including the second end face 250b and the eighth exterior surface 160h, perpendicular to the fifth longitudinal center axis 165e. In several embodiments, the third through-holes 285c are cylindrical. Alternatively, the third through-holes 285c may be noncylindrical. The third through-holes 285c are distributed around the second through-holes 285b. In several embodiments, the third through-holes 285c are concentrically distributed around the second through-holes 285b. In several embodiments, the third through-holes 285c are evenly distributed around the second through-holes 285b. In several embodiments, the third through-holes 285c each have a diameter of 5/16-inch.

Fourth through-holes 285d (shown in FIGS. 5D and 5E) are also formed through the deflector element 220, including the second end face 250b and the eighth exterior surface 160h, perpendicular to the fifth longitudinal center axis 165e. In several embodiments, the fourth through-holes 285d are cylindrical. Alternatively, the fourth through-holes 285d may be noncylindrical. The fourth through-holes 285d are distributed around the third through-holes 285c. In several embodiments, the fourth through-holes 285d are concentrically distributed around the third through-holes 285c. In several embodiments, the fourth through-holes 285d are evenly distributed around the third through-holes 285c. In several embodiments, the fourth through-holes 285d each have a diameter of ⅜-inch.

Fifth through-holes 285e (shown in FIGS. 5D and 5E) are also formed through the deflector element 220, including the second end face 250b and the eighth exterior surface 160h, perpendicular to the fifth longitudinal center axis 165e. In several embodiments, one or more of the fifth through-holes 285e intersect the eighth exterior surface 160h of the deflector element 220 and may therefore be characterized instead as notches. In several embodiments, the fifth through-holes 285e are noncylindrical. In several embodiments, the fifth through-holes 285e each define fifth and sixth interior surfaces contoured to adjacent ones of the fourth through-holes 285d to establish consistent wall thicknesses between the fifth through-hole and the adjacent ones of the fourth through-holes 285d. In several embodiments, the fifth through-holes 285e each define a seventh interior surface contoured to align with the third interior surface 195c defined in the flow block 145 when the filter assembly 115 is assembled. Alternatively, the fifth through-holes 285e may be cylindrical. The fifth through-holes 285e are distributed around the fourth through-holes 285d. In several embodiments, the fifth through-holes 285e are concentrically distributed around the fourth through-holes 285d. In several embodiments, the fifth through-holes 285e are evenly distributed around the fourth through-holes 285d.

In several embodiments, the first through-hole 285a, the second through-holes 285b, the third through-holes 285c, the fourth through-holes 285d, and the fifth through-holes 285e are formed through the deflector element 220 by water jetting. Such water jetting may occur before the deflector element 220 is truncated to form the second end face 250b.

Referring to FIG. 7, the filter assembly 115 is illustrated in an assembled state in which: the flanged portion 230b of the cap 210 is bolted to the first exterior surface 160a of the flow cross 135 via the plurality of through-holes 235 formed through the flanged portion 230b and the first plurality of threaded-holes 180a formed in the first exterior surface 160a; the first sealing element 260a sealingly engages the cap 210 and the flow block 145; the extension rod 215 extends within the first end portion 185a of the first passage 150 formed in the flow block 145; the second sealing element 260b sealingly engages the deflector element 220 and the flow block 145; the deflector element 220 extends at the intersection between the first and second passages 150 and 155 formed in the flow block 145; the distal tip portion 275 of the wedge-shaped eighth end portion 185h of the deflector element 220 extends within the second end portion 185b of the first passage 150 formed in the flow block 145; the leading portion 280a extends within the third end portion 185c of the second passage 155; and the trailing portion 280b extends within the fourth end portion 185d of the second passage 155.

In several embodiments, in the assembled state of the filter assembly 115, the second end face 250b of the deflector element 220 extends at a second angle A2 relative to the first elliptical ridge 205a formed in the flow block 145. In several embodiments, the second angle A2 is approximately 5 degrees (+/−5 degrees). In several embodiments the second angle A2 is 7 degrees.

In several embodiments, in the assembled state of the filter assembly 115: the leading portion 280a is coplanar with the second longitudinal center axis 165b along which the second passage 155 extends; and/or the leading portion 280a is adapted to lie within the plane perpendicular to both the first plane 190a that separates the opposing first and second end portions 185a and 185b of the first passage 150 and the second plane 190b that separates the opposing third and fourth end portions 185c and 185d of the second passage 155. Similarly, in several embodiments, in the assembled state of the filter assembly 115: the trailing portion 280b is coplanar with the second longitudinal center axis 165b along which the second passage 155 extends; and/or the trailing portion 280b is adapted to lie within the plane perpendicular to both the first plane 190a that separates the opposing first and second end portions 185a and 185b of the first passage 150 and the second plane 190b that separates the opposing third and fourth end portions 185c and 185d of the second passage 155.

In several embodiments, in the assembled state of the filter assembly 115, the distal tip portion 275 of the wedge-shaped eighth end portion 185h of the deflector element 220 overlaps the first elliptical ridge 205a formed in the flow block 145. The overlapping of the distal tip portion 275 past the first elliptical ridge 205a allows the first ridge to support the deflector element 220 proximate the distal tip portion 275 during operation to thereby prevent, or at least reduce, failure of the deflector element 220 at or near the distal tip portion 275. As a result, the reliability and/or the durability of the deflector element 220 may be increased. Alternatively, in several embodiments, the distal tip portion 275 of the wedge-shaped eighth end portion 185h of the deflector element 220 does not overlap the first elliptical ridge 205a formed in the flow block 145. In several embodiments, in the assembled state of the filter assembly 115, the fifth longitudinal center axis 165e and the first longitudinal center axis 165a are either coaxial (as shown in FIG. 7) or spaced in a parallel relation. In several embodiments, in the assembled state of the filter assembly 115 and as shown in FIG. 7, the first longitudinal center axis 165a and the second longitudinal center axis 165b intersect in a perpendicular relation.

In operation, as shown in FIGS. 1 and 7, the filter assembly 115 receives wellbore fluid from the wellhead 110 into the third end portion 185c of the second passage 155 formed in the flow block 145. At least a portion of any particulate materials in the wellbore fluid are deflected by the second end face 250b of the deflector element 220 into the second end portion 185b of the first passage 150 formed in the flow block 145, thereby separating said deflected portion of the particulate materials from the wellbore fluid. Said deflected portion of the particulate materials is accumulated in the accumulator 130. The remaining portion of the wellbore fluid flows through the first through-hole 285a, the second through-holes 285b, the third through-holes 285c, the fourth through-holes 285d, and/or the fifth through-holes 285e formed through the deflector element 220 into the fourth end portion 185d of the second passage 155 formed in the flow block 145. Said remaining portion of the wellbore fluid is communicated to the pipeline 120 for further processing.

In several embodiments, the third diameter D3 of the third end portion 185c of the second passage 155 in the flow block 145 is 2.59-inches. As a result, a portion of the deflector element 220 having a total cross-sectional area of 5.265-square-inches is aligned with the third end portion 185c of the second passage 155 in the flow block 145. Of this 5.265-square-inch cross-sectional area of the deflector element 220 aligned with the third end portion 185c of the second passage 155 in the flow block 145, a cross-sectional area of approximately 3-square-inches (+/−10%) is taken up by the first through-hole 285a, the second through-holes 285b, the third through-holes 285c, the fourth through-holes 285d, and the fifth through-holes 285e, in combination. In several embodiments, the ratio of the cross-sectional area taken up by the first through-hole 285a, the second through-holes 285b, the third through-holes 285c, the fourth through-holes 285d, and the fifth through-holes 285e, in combination, to the cross-sectional area of the deflector element 220 aligned with the third end portion 185c of the second passage 155 in the flow block 145 is approximately 0.6 or 60% (+/−10%).

Although described herein as including the first through-hole 285a, the second through-holes 285b, the third through-holes 285c, the fourth through-holes 285d, and the fifth-through holes 285e, in addition, or instead, any number and/or pattern of through-holes may be formed through the deflector element 220, including the second end face 250b and the eighth exterior surface 160h, perpendicular to the fifth longitudinal center axis 165e.

Although described herein as being part of the oil and/or gas production system 100, in addition, or instead, the filter assembly 115, including the flow cross 135 and the flow bore deflector 140, may form part of another fluid processing system such as, for example, an oil and/or gas drilling system, an oil and/or gas completions system, another oil and/or gas system (e.g., a refinery system), a water treatment system, a wastewater treatment system, the like, or any combination thereof.

Figure 8A:
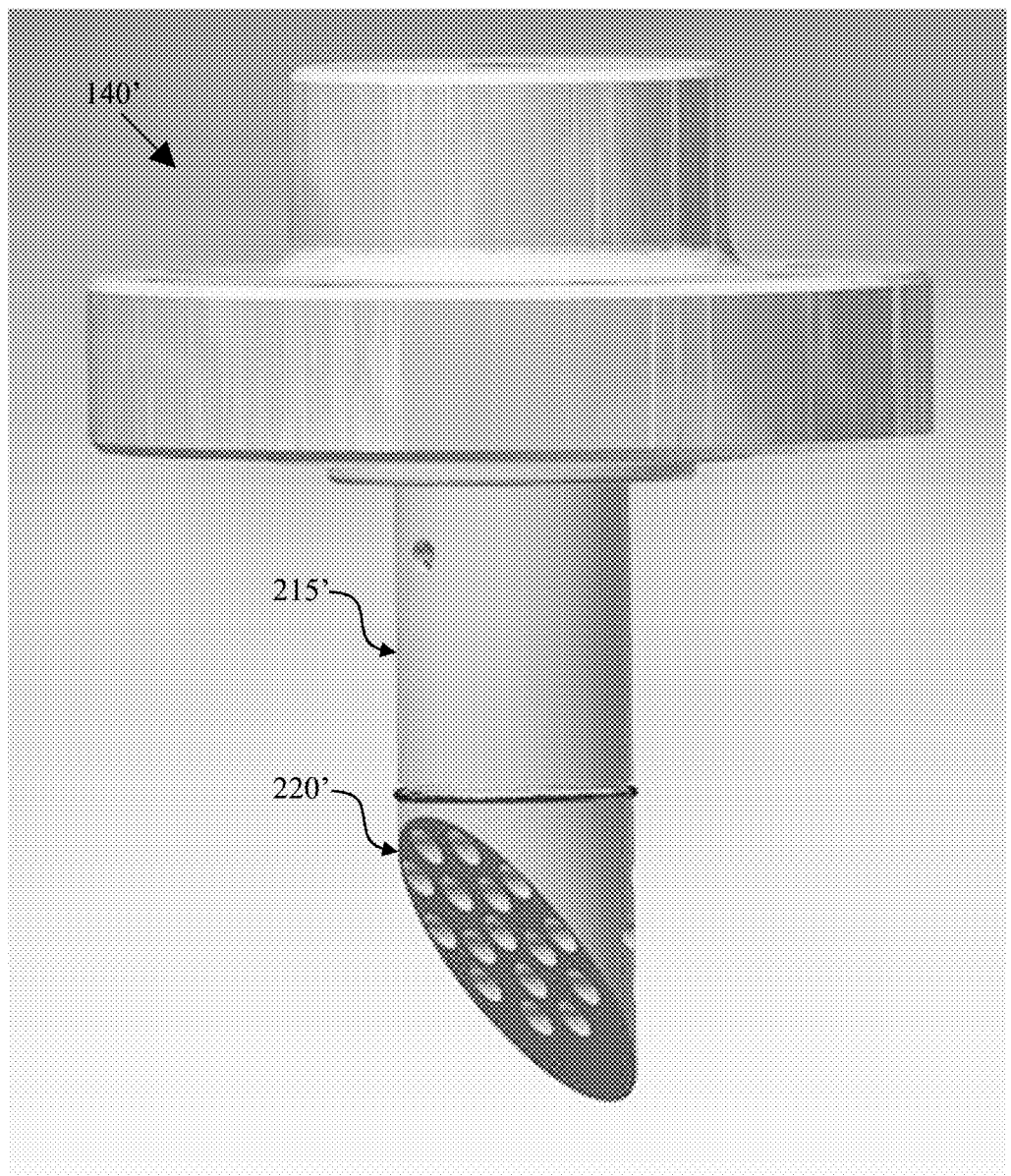
FIG. 8A is an elevational view of a flow bore deflector of the filter assembly of the oil and/or gas system of FIG. 1, according to one or more embodiments of the present disclosure.
Figure 8B:
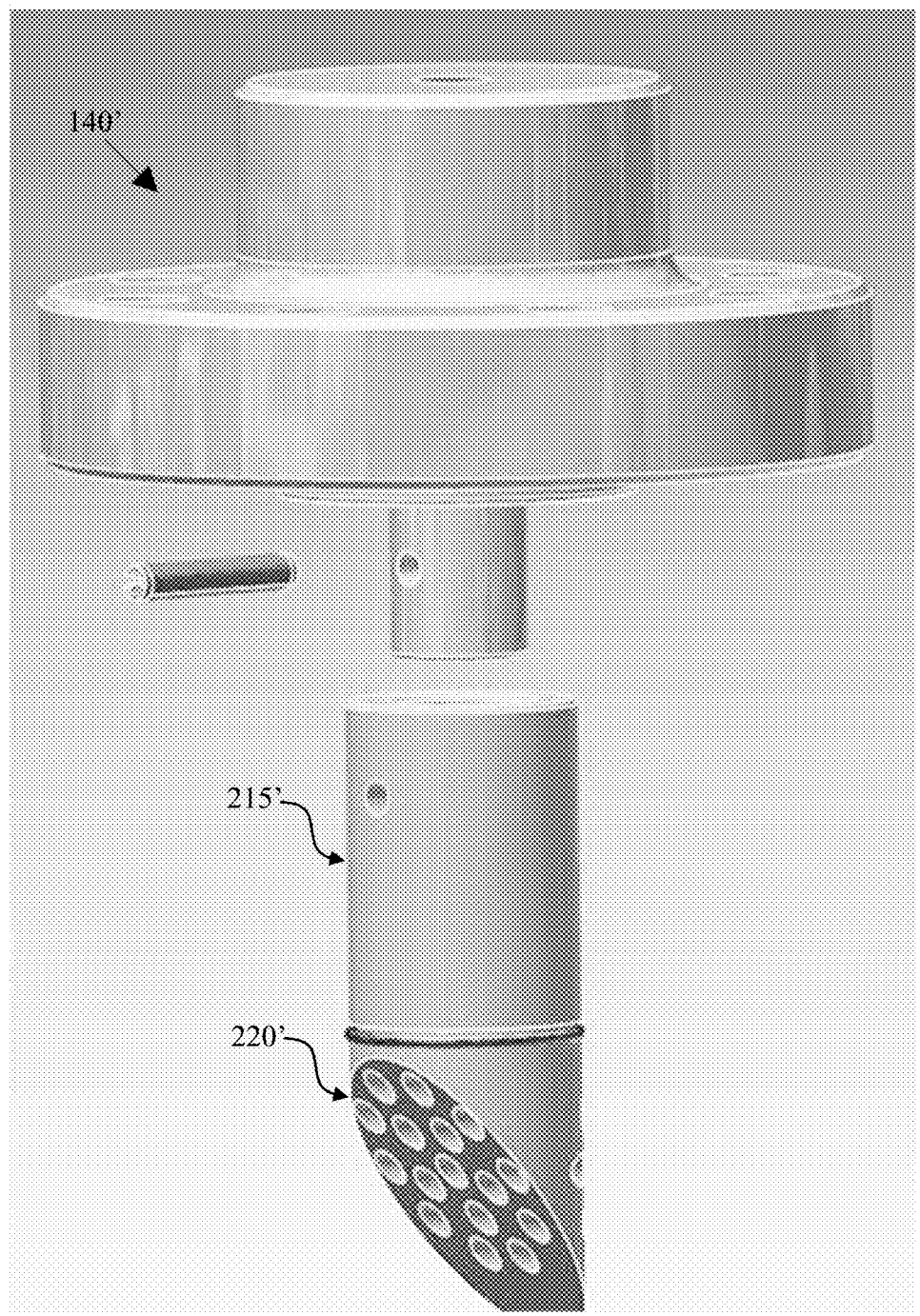
FIG. 8B is an exploded perspective view of the flow bore deflector of FIG. 8A, according to one or more embodiments of the present disclosure.

Referring the FIGS. 8A and 8B, a flow bore deflector 140' is illustrated. The flow bore deflector 140' is substantially similar to the flow bore deflector 140 shown in FIGS. 2A-2D, except that the extension rod 215' and the deflector element 220' are integrally formed as one piece; this integral formation eliminates the need for an additional connection between the two components and also reduces the amount of machining required to manufacture the flow bore deflector 140' as compared to the flow deflector 140. The remaining features of the flow bore deflector 140' are substantially identical to the corresponding features of the flow bore deflector 140 shown in FIGS. 2A-2D and, therefore, will not be described in further detail.

Figure 8C:
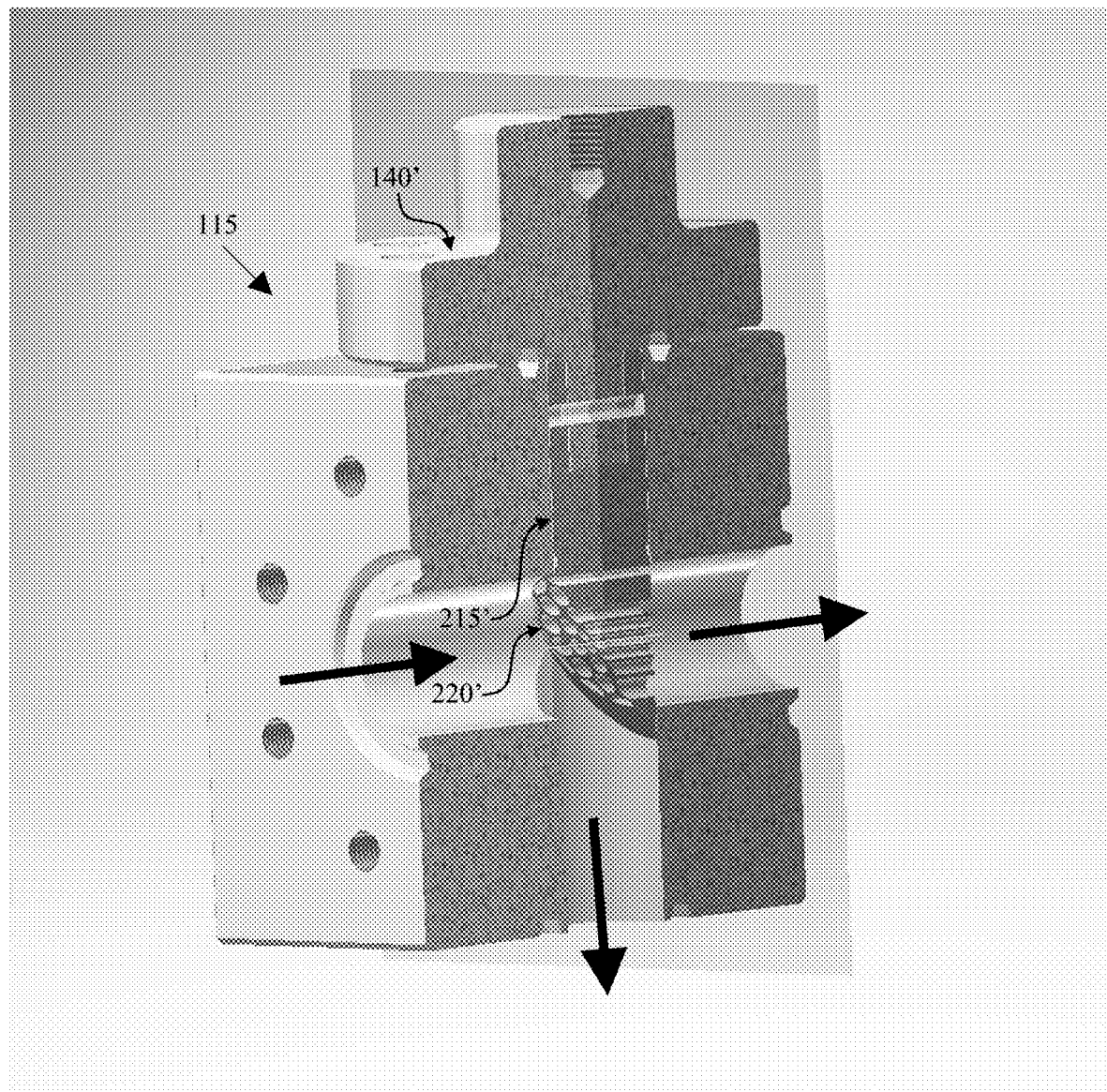
FIG. 8C is a cross-sectional view of the filter assembly of FIG. 1 including the flow bore deflector of FIGS. 8A and 8B, according to one or more embodiments of the present disclosure.
Figure 8D:
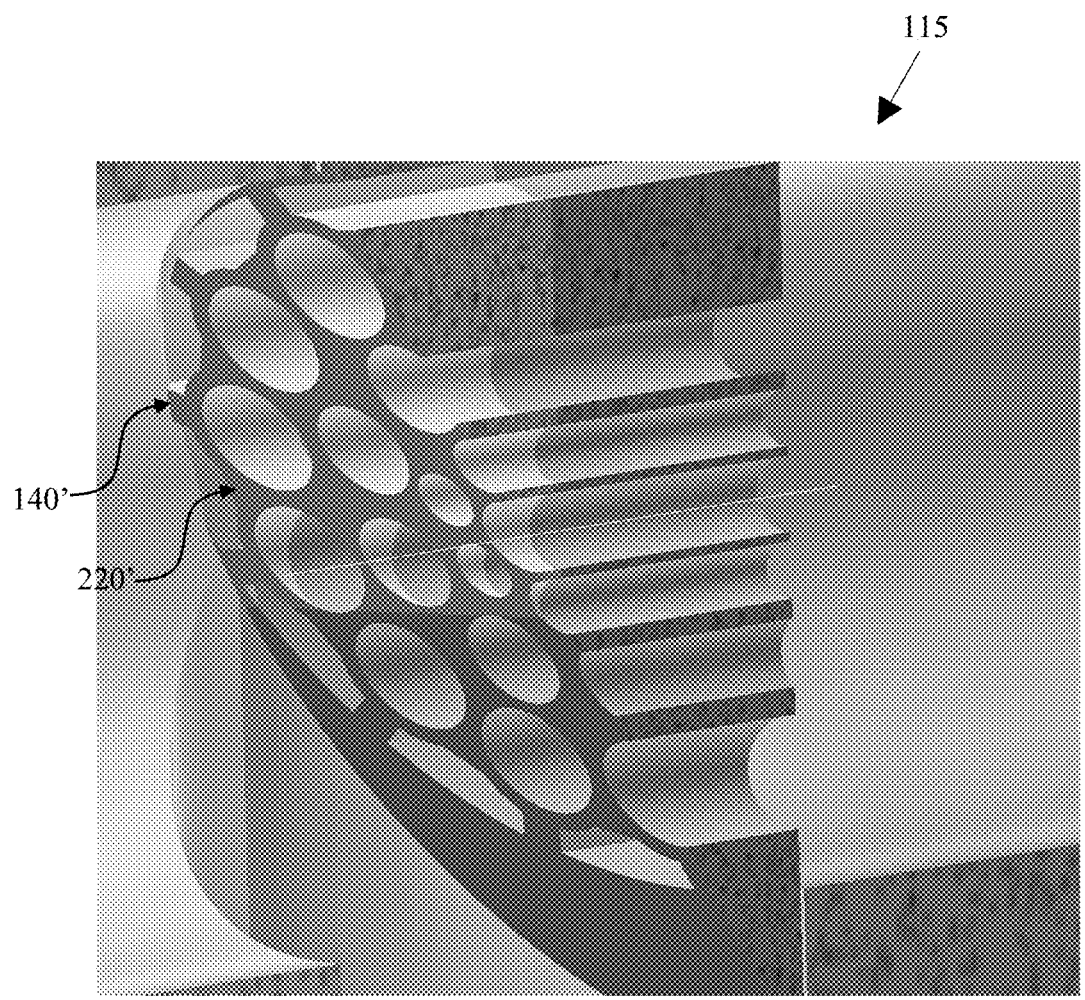
FIG. 8D is an enlarged cross-sectional view of the filter assembly of FIG. 8C, according to one or more embodiments of the present disclosure.

Referring to FIGS. 8C and 8D, the flow bore deflector 140' of FIGS. 8A and 8B is illustrated in an assembled state (i.e., as part of the filter assembly 115), which is substantially similar to that shown in FIG. 7 and, therefore, the assembled state of the flow bore deflector 140' will not be described in further detail.

An apparatus has been disclosed. The apparatus is adapted to be operably coupled to an oil and/or gas wellhead. The apparatus generally includes: a deflector element adapted to deflect particulate materials in a fluid, the deflector element extending along a first axis, the deflector element defining a cylindrical exterior surface, the deflector element further defining an end face angled, relative to the first axis, and adapted to deflect the particulate materials in the fluid; and a plurality of through-holes through which the fluid is adapted to flow after the particulate materials are deflected by the end face, the plurality of through-holes being formed through the deflector element, including through each of the end face and the cylindrical exterior surface. In one or more embodiments, the end face is planar. In one or more embodiments, the apparatus further includes: a flow block connected to the deflector element and adapted to receive the fluid and the particulate materials therein before the deflector element deflects the particulate materials, the flow block defining: a first passage extending along a second axis; and a second passage extending along a third axis and intersecting the first passage. In one or more embodiments, the first and second axes are either coaxial or spaced in a parallel relation; and the second and third axes intersect in a perpendicular relation. In one or more embodiments, the deflector element extends at the intersection between the first and second passages of the flow block. In one or more embodiments, the cylindrical exterior surface of the deflector element defines opposing leading and trailing portions at which the deflector element has first and second heights, respectively, the first height being a minimal height of the deflector element, and the second height being a maximal height of the deflector element. In one or more embodiments, the first passage includes opposing first and second end portions separated by a first plane, the first and second end portions of the first passage defining first and second interior surfaces, respectively, of the flow block, the first plane being perpendicular to the second axis along which the first passage extends, and the third axis along which the second passage extends lying in the first plane; and the end face of the deflector element is adapted to deflect the particulate materials into the second end portion of the first passage. In one or more embodiments, the second passage includes opposing third and fourth end portions separated by a second plane, the third and fourth end portions of the second passage defining third and fourth interior surfaces, respectively, of the flow block, the second plane being perpendicular to the third axis along which the second passage extends, and the second axis along which the first passage extends lying in the second plane; the third end portion of the second passage is adapted to receive the fluid and the particulate materials therein before the deflector element deflects the particulate materials; and the fourth end portion of the second passage is adapted to receive the fluid after the fluid flows through the plurality of through-holes in the deflector element. In one or more embodiments, the first and third interior surfaces intersect to form a first semielliptical ridge in the flow block; the second and fourth interior surfaces intersect to form a second semielliptical ridge in the flow block; and the first and second semielliptical ridges, in combination, define an elliptical ridge. In one or more embodiments, the end face of the deflector element is angled relative to the elliptical ridge of the flow block. In one or more embodiments, the second end portion of the deflector element further defines a distal tip portion; and the distal tip portion of the deflector element overlaps the elliptical ridge in the flow block.

A system has also been disclosed. The system, generally includes: a wellhead adapted to receive wellbore fluid from an oil and/or gas wellbore; and a filter assembly adapted to receive the wellbore fluid from the wellhead, the filter assembly including: a deflector element adapted to deflect particulate materials to thereby separate the particulate materials from the wellbore fluid, the deflector element extending along a first axis and defining: a cylindrical exterior surface; and an end face angled relative to the first axis and adapted to deflect the particulate materials from the wellbore fluid; and a plurality of through-holes through which the wellbore fluid is adapted to flow after the particulate materials are deflected by the end face, the plurality of through-holes being formed through the deflector element, including through each of the end face and the cylindrical exterior surface. In one or more embodiments, the end face is planar. In one or more embodiments, the filter assembly further includes a flow block adapted to receive the wellbore fluid before the deflector element separates the particulate materials from the wellbore fluid, the flow block defining: a first passage extending along a second axis; and a second passage extending along a third axis and intersecting the first passage. In one or more embodiments, the second and third axes intersect in a perpendicular relation. In one or more embodiments, the deflector element extends at the intersection between the first and second passages of the flow block. In one or more embodiments, the cylindrical exterior surface of the deflector element further defines opposing leading and trailing portions at which the deflector element has first and second heights, respectively, the first height being a minimal height of the deflector element, and the second height being a maximal height of the deflector element.

A method has also been disclosed. The method generally includes: flowing a fluid from an oil and/or gas wellbore and through a wellhead; separating particulate materials from the fluid using a deflector element, the deflector element extending along a first axis and defining: a cylindrical exterior surface; and an end face that deflects the particulate materials to separate the particulate materials from the fluid, the end face being angled relative to the first axis; and flowing the fluid through a plurality of through-holes that are formed through deflector element, including through each of the end face and the cylindrical exterior surface. In one or more embodiments, the method further includes: before deflecting the particulate materials from the fluid using the deflector element, receiving the fluid into a flow block, the flow block defining: a first passage extending along a second axis; and a second passage extending along a third axis and intersecting the first passage. In one or more embodiments, the first passage includes opposing first and second end portions separated by a first plane, the first and second end portions of the first passage defining first and second interior surfaces, respectively, of the flow block, the first plane being perpendicular to the second axis along which the first passage extends, and the third axis along which the second passage extends lying in the first plane; the deflector element extends at the intersection between the first and second passages of the flow block; and deflecting the particulate materials from the fluid using the deflector element includes: deflecting the particulate materials from the fluid and into the second end portion of the first passage using the end face of the deflector element. In one or more embodiments, the second passage includes opposing third and fourth end portions separated by a second plane, the third and fourth end portions of the second passage defining third and fourth interior surfaces, respectively, of the flow block, the second plane being perpendicular to the third axis along which the second passage extends, and the second axis along which the first passage extends lying in the second plane; receiving the fluid into the flow block includes: receiving the fluid into the third end portion of the second passage before the deflector element separates the particulate materials from the fluid; and the method further includes: receiving the fluid into the fourth end portion of the second passage after the fluid flows through the plurality of through-holes in the deflector element.

It is understood that variations may be made in the foregoing without departing from the scope of the present disclosure.

In one or more embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes, and/or procedures may be merged into one or more steps, processes and/or procedures.

In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus adapted to be operably coupled to an oil and/or gas wellhead, the apparatus comprising:
    a deflector element adapted to deflect particulate materials in a fluid, the deflector element extending along a first axis, the deflector element defining a cylindrical exterior surface, the deflector element further defining an end face angled, relative to the first axis, and adapted to deflect the particulate materials in the fluid; and
    a plurality of through-holes through which the fluid is adapted to flow after the particulate materials are deflected by the end face, each of the plurality of through-holes:
        being formed through both the end face and the cylindrical exterior surface; and
        extending transversely from the end face and to the cylindrical exterior surface.

2. The apparatus of claim 1, wherein the end face is planar.

3. The apparatus of claim 1, further comprising:
    a flow block connected to the deflector element and adapted to receive the fluid and the particulate materials therein before the deflector element deflects the particulate materials, the flow block defining:
        a first passage extending along a second axis; and
        a second passage extending along a third axis and intersecting the first passage.

4. The apparatus of claim 3,
    wherein the first and second axes are either coaxial or spaced in a parallel relation; and
    wherein the second and third axes intersect in a perpendicular relation.

5. The apparatus of claim 3,
    wherein the deflector element extends at the intersection between the first and second passages of the flow block.

6. The apparatus of claim 5,
    wherein the cylindrical exterior surface of the deflector element defines opposing leading and trailing portions at which the deflector element has first and second heights, respectively, the first height being a minimal height of the deflector element, and the second height being a maximal height of the deflector element.

7. The apparatus of claim 5,
    wherein the first passage includes opposing first and second end portions separated by a first plane,
        the first and second end portions of the first passage defining first and second interior surfaces, respectively, of the flow block,
        the first plane being perpendicular to the second axis along which the first passage extends, and
        the third axis along which the second passage extends lying in the first plane;
    and
    wherein the end face of the deflector element is adapted to deflect the particulate materials into the second end portion of the first passage.

8. The apparatus of claim 7,
    wherein the second passage includes opposing third and fourth end portions separated by a second plane,
        the third and fourth end portions of the second passage defining third and fourth interior surfaces, respectively, of the flow block,
        the second plane being perpendicular to the third axis along which the second passage extends, and
        the second axis along which the first passage extends lying in the second plane;
    wherein the third end portion of the second passage is adapted to receive the fluid and the particulate materials therein before the deflector element deflects the particulate materials; and
    wherein the fourth end portion of the second passage is adapted to receive the fluid after the fluid flows through the plurality of through-holes in the deflector element.

9. The apparatus of claim 8,
    wherein the first and third interior surfaces intersect to form a first semielliptical ridge in the flow block;
    wherein the second and fourth interior surfaces intersect to form a second semielliptical ridge in the flow block; and
    wherein the first and second semielliptical ridges, in combination, define an elliptical ridge.

10. The apparatus of claim 9,
    wherein the end face of the deflector element is angled relative to the elliptical ridge of the flow block.

11. The apparatus of claim 9,
    wherein the second end portion of the deflector element further defines a distal tip portion; and
    wherein the distal tip portion of the deflector element overlaps the elliptical ridge in the flow block.

12. A system, comprising:
    a wellhead adapted to receive wellbore fluid from an oil and/or gas wellbore; and
    a filter assembly adapted to receive the wellbore fluid from the wellhead, the filter assembly comprising:
        a deflector element adapted to deflect particulate materials to thereby separate the particulate materials from the wellbore fluid, the deflector element extending along a first axis and defining:
            a cylindrical exterior surface; and
            an end face angled relative to the first axis and adapted to deflect the particulate materials from the wellbore fluid;
        and
        a plurality of through-holes through which the wellbore fluid is adapted to flow after the particulate materials are deflected by the end face, each of the plurality of through-holes:
            being formed through both the end face and the cylindrical exterior surface; and
            extending transversely from the end face and to the cylindrical exterior surface.

13. The system of claim 12, wherein the end face is planar.

14. The system of claim 12, wherein the filter assembly further comprises a flow block adapted to receive the wellbore fluid before the deflector element separates the particulate materials from the wellbore fluid, the flow block defining:
    a first passage extending along a second axis; and a second passage extending along a third axis and intersecting the first passage.

15. The system of claim 14, wherein the second and third axes intersect in a perpendicular relation.

16. The system of claim 14, wherein the deflector element extends at the intersection between the first and second passages of the flow block.

17. The system of claim 16, wherein the cylindrical exterior surface of the deflector element further defines opposing leading and trailing portions at which the deflector element has first and second heights, respectively, the first height being a minimal height of the deflector element, and the second height being a maximal height of the deflector element.

18. A method, comprising:
flowing a fluid from an oil and/or gas wellbore and through a wellhead;
separating particulate materials from the fluid using a deflector element, the deflector element extending along a first axis and defining:
a cylindrical exterior surface; and
an end face that deflects the particulate materials to separate the particulate materials from the fluid, the end face being angled relative to the first axis; and
flowing the fluid through a plurality of through-holes, each of the plurality of through-holes:
being formed through both the end face and the cylindrical exterior surface; and
extending transversely from the end face and to the cylindrical exterior surface.

19. The method of claim 18, further comprising:
before deflecting the particulate materials from the fluid using the deflector element, receiving the fluid into a flow block, the flow block defining:
a first passage extending along a second axis; and
a second passage extending along a third axis and intersecting the first passage.

20. The method of claim 19,
wherein the first passage includes opposing first and second end portions separated by a first plane,
the first and second end portions of the first passage defining first and second interior surfaces, respectively, of the flow block,
the first plane being perpendicular to the second axis along which the first passage extends, and
the third axis along which the second passage extends lying in the first plane;
wherein the deflector element extends at the intersection between the first and second passages of the flow block; and
wherein deflecting the particulate materials from the fluid using the deflector element comprises:
deflecting the particulate materials from the fluid and into the second end portion of the first passage using the end face of the deflector element.

21. The method of claim 20,
wherein the second passage includes opposing third and fourth end portions separated by a second plane,
the third and fourth end portions of the second passage defining third and fourth interior surfaces, respectively, of the flow block,
the second plane being perpendicular to the third axis along which the second passage extends, and
the second axis along which the first passage extends lying in the second plane;
wherein receiving the fluid into the flow block comprises:
receiving the fluid into the third end portion of the second passage before the deflector element separates the particulate materials from the fluid;
and
wherein the method further comprises:
receiving the fluid into the fourth end portion of the second passage after the fluid flows through the plurality of through-holes in the deflector element.

* * * * *